(12) United States Patent
Attar

(10) Patent No.: US 9,367,113 B2
(45) Date of Patent: Jun. 14, 2016

(54) MANAGING MODEM POWER CONSUMPTION

(71) Applicant: Qualcomm Incorporated, San Diego, CA (US)

(72) Inventor: Rashid Ahmed Akbar Attar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 262 days.

(21) Appl. No.: 13/739,655

(22) Filed: Jan. 11, 2013

(65) Prior Publication Data

US 2014/0201556 A1   Jul. 17, 2014

(51) Int. Cl.
*G06F 1/32* (2006.01)
*H04W 52/02* (2009.01)

(52) U.S. Cl.
CPC ......... *G06F 1/3206* (2013.01); *H04W 52/0245* (2013.01); *Y02B 60/50* (2013.01)

(58) Field of Classification Search
CPC ... G06F 1/3206; G06F 1/3287; G06F 1/3228; G06F 1/3243; G06F 1/3278; H04W 52/0245; H04W 52/0229
See application file for complete search history.

(56) References Cited

U.S. PATENT DOCUMENTS

| | | | |
|---|---|---|---|
| 6,038,609 A | 3/2000 | Geulen | |
| 6,334,047 B1 * | 12/2001 | Andersson et al. | 455/69 |
| 7,263,333 B2 | 8/2007 | Roberts | |
| 7,787,892 B2 * | 8/2010 | Yang et al. | 455/458 |
| 8,121,585 B2 | 2/2012 | Commarford et al. | |
| 8,135,443 B2 * | 3/2012 | Aleksic | H02J 9/002 320/120 |
| 8,224,402 B2 | 7/2012 | Sengupta et al. | |
| 8,751,592 B2 * | 6/2014 | Garcia | H04L 51/32 370/229 |
| 8,885,533 B2 * | 11/2014 | Fang et al. | 370/311 |
| 2002/0071395 A1 | 6/2002 | Redi et al. | |
| 2004/0002367 A1 * | 1/2004 | Chanut | G06F 8/61 455/574 |
| 2004/0203722 A1 * | 10/2004 | Lassers et al. | 455/423 |
| 2006/0045117 A1 | 3/2006 | Qi et al. | |
| 2006/0270385 A1 | 11/2006 | Morris | |
| 2007/0058669 A1 | 3/2007 | Hoffmann et al. | |
| 2009/0156269 A1 * | 6/2009 | Harris et al. | 455/574 |
| 2010/0014459 A1 | 1/2010 | Mir et al. | |
| 2011/0080868 A1 | 4/2011 | Krishnaswamy et al. | |
| 2011/0151884 A1 * | 6/2011 | Zhao | 455/452.1 |
| 2012/0128045 A1 | 5/2012 | Ling et al. | |

(Continued)

OTHER PUBLICATIONS

International Search Report and Written Opinion—PCT/US2013/077312—ISA/EPO—Apr. 7, 2014.
Taiwan Search Report—TW103100387—TIPO—May 13, 2015.
Co-pending U.S. Appl. No. 14/019,843, filed Sep. 6, 2013.

*Primary Examiner* — Mohammed Rehman
*Assistant Examiner* — Brian J Corcoran
(74) *Attorney, Agent, or Firm* — Chui-kiu Teresa Wong; Paul Holdaway

(57) ABSTRACT

Methods, systems, and devices are described for managing power consumption in a modem of a mobile device. A receive power associated with a receiver of the modem may be measured during a scheduled power-up of the modem associated with checking for paging messages. A power consumption metric associated with transmitting a pending wireless data transaction at a transmitter of the modem may then be estimated based on the measured receive power associated with the receiver. A determination of whether to transmit the pending wireless data transaction at a first time may then be made based at least in part on the estimated power consumption metric.

42 Claims, 13 Drawing Sheets

(56) References Cited

U.S. PATENT DOCUMENTS

| | | |
|---|---|---|
| 2012/0129564 A1 | 5/2012 | De La Cropte De Chanterac |
| 2012/0207098 A1 | 8/2012 | Cooley et al. |
| 2013/0122804 A1* | 5/2013 | Narendra .......... H04W 52/0277 455/41.1 |
| 2014/0157009 A1* | 6/2014 | Kherani ................ G06F 1/3278 713/300 |

* cited by examiner

500

|  | Low Cost | Medium Cost | High Cost |
|---|---|---|---|
| Low Priority | Y | N | N |
| Medium Priority | Y | Y | N |
| High Priority | Y | Y | Y |

FIG. 5

MANAGING MODEM POWER CONSUMPTION

TECHNICAL FIELD

The technology discussed in this patent application relates generally to wireless communication, and more specifically, to managing modem power consumption in a mobile device. Embodiments of the present invention can be utilized in varying features for communication components.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Many mobile devices are battery powered. The battery of a mobile device may store a finite amount of energy for powering the mobile device between charging cycles. The size of many mobile devices constrains the size of battery available to those devices, and therefore the amount of energy available to power them. Moreover, certain components of the mobile device, including the transmitter and receiver of the modem, may consume a relatively large amount of power when active. Thus, a need exists for solutions that manage modem power consumption in a mobile device to extend the battery life of the mobile device.

BRIEF SUMMARY OF SOME EXAMPLES

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. The summary's purpose is to present some concepts of one or more aspects of the disclosure in a simplified form as a prelude to the more detailed description that is presented later.

Methods, devices, systems, and computer program products are disclosed for managing power consumption in a mobile device. When a wireless data transaction (e.g., transmission of wireless data) is pending at the mobile device, a receive power associated with a receiver of the modem may be measured during a scheduled power-up of the modem associated with checking for paging messages. A power consumption metric associated with transmitting the pending wireless data transaction may be estimated based on the measured receive power. The determination of whether to transmit the pending wireless data transaction during a first period of time may then be made based at least in part on the estimated power consumption metric.

According to a first set of examples, a method of managing power consumption in a modem of a mobile device may include: measuring, during a scheduled power-up of the modem associated with checking for paging messages, a receive power associated with a receiver of the modem; estimating a power consumption metric associated with transmitting a pending wireless data transaction at a transmitter of the modem based on the measured receive power associated with the receiver; and determining whether to transmit the pending wireless data transaction at a first time. The determination may be based at least in part on the estimated power consumption metric.

In certain examples, the power consumption metric may be estimated by performing a predetermined mapping function to derive the power consumption metric from the measured receive power of the receiver. The measurement of the receive power of the receiver and the predetermined mapping function may, in certain examples, be performed during each scheduled power-up of the modem to check for paging messages. Performing the predetermined mapping function may include, for example, mapping the measured receive power to a transmit power; mapping the transmit power to an instantaneous cost of transmission; and mapping the instantaneous cost of transmission to a total cost of transmitting the pending wireless data transaction.

In certain examples, the method may include determining not to transmit the pending wireless data transaction at the first time based on the power consumption metric and estimating a second power consumption metric for the pending wireless data transaction at a second time after the first time. The modem may be powered down based at least in part on the determination not to transmit the pending wireless data transaction at the first time. In certain examples, a determination to transmit the pending wireless transaction at the second time may be made based at least in part on the received second power consumption metric.

In certain examples, the method may include determining not to transmit the pending wireless data transaction at the first time based on power consumption metric, determining that a timer associated with the pending wireless data transaction has expired, and transmitting the pending wireless data transaction based at least in part on the expiration of the timer. A priority associated with the pending wireless data transaction may be increased in response to the determination that the timer has expired, and the pending wireless data transaction may be transmitted based at least in part on a determination that the increased priority of the pending wireless data transaction outweighs the power consumption metric.

In certain examples, the method may include identifying a priority associated with the pending wireless data transaction and comparing the priority associated with the pending wireless data transaction with the power consumption metric associated with transmitting the pending wireless data transaction. The determination of whether to transmit the wireless data transaction may be based on the comparison.

In certain examples, the method may include transmitting an indication of the power consumption metric to an application associated with the pending wireless data transaction over an application programming interface (API). The transmission of the power consumption metric to the application over the API may occur in response to a request for the power consumption metric received at the modem over the API from the application. In certain examples, the power consumption metric may be classified into a selected category of a number of predetermined categories. The indication of the power consumption metric transmitted to the application may, for example, include the selected category.

In certain examples, the determination of whether to transmit the pending wireless data transaction may occur at the application. Additionally or alternatively, the determination may occur at the modem. In certain examples, the modem may receive the pending wireless data transaction at a buffer associated with the modem, and the modem may transmit the pending wireless data transaction from the buffer of the modem to a network based on the determination.

In a second set of examples, a mobile device may include a transmitter, a receiver, a receive power measurement module, a power consumption metric module, and a transaction decision module. The receive power measurement module may be configured to measure, during a scheduled power-up of a modem associated with receiving paging messages, a receive power associated with the receiver. The power consumption metric module may be configured to estimate a power consumption metric associated with transmitting a pending wireless data transaction at the transmitter based on the measured receive power associated with the receiver. The transaction decision module may be configured to determine whether to transmit the pending wireless data transaction at the transmitter at a first time. The determination may be based at least in part on the estimated power consumption metric.

In a third set of examples, an apparatus for managing power consumption in a modem of a mobile device may include at least means for measuring, during a scheduled power-up of the modem associated with checking for paging messages, a receive power associated with a receiver of the modem; means for estimating a power consumption metric associated with transmitting a pending wireless data transaction at a transmitter of the modem based on the measured receive power associated with the receiver; and means for determining whether to transmit the pending wireless data transaction at a first time. The determination may be based at least in part on the estimated power consumption metric.

In a fourth set of examples, a computer program product may include a tangible computer readable storage device having computer-readable program code stored thereon. The computer-readable program code may include computer readable program code configured to cause at least one processor to measure, during a scheduled power-up of the modem associated with checking for paging messages, a receive power associated with a receiver of the modem; computer readable program code configured to cause the at least one processor to estimate a power consumption metric associated with transmitting a pending wireless data transaction at a transmitter of the modem based on the measured receive power associated with the receiver; and computer readable program code configured to cause the at least one processor to determine whether to transmit the pending wireless data transaction at a first time. The determination may be based at least in part on the estimated power consumption metric.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 shows a diagram of an example of a decision table for determining whether to conduct a pending wireless data transaction at a given time according to some embodiments;

DETAILED DESCRIPTION

Figure 1:
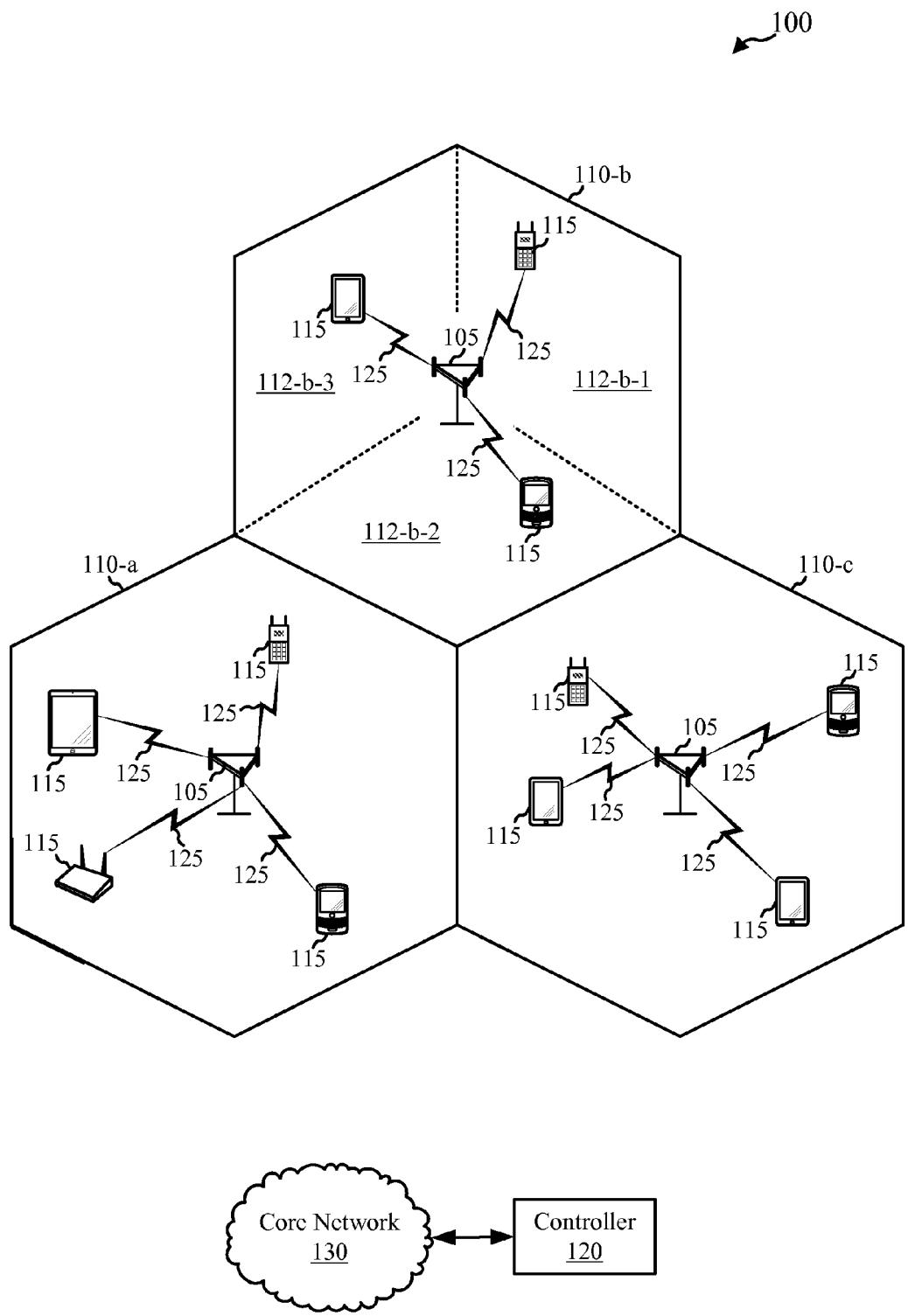
FIG. 1 shows a block diagram of an example of a wireless communications system in which some embodiments may be utilized.

The technology discussed in this patent application enables and relates to management of modem power consumption in a communications device (e.g., mobile device, smart phone, cell phone, entertainment device, etc.). When a wireless data transaction (e.g., transmission of wireless data) is pending at the mobile device, a receive power associated with a receiver of the modem may be measured during a scheduled power-up of the modem associated with checking for paging messages. A power consumption metric associated with transmitting a pending wireless data transaction may be estimated based on the measured receive power. The determination of whether to transmit the pending wireless data transaction during a first period of time may then be made based at least in part on the estimated power consumption metric.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing FDMA and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 may include base stations 105 (or cells), mobile devices 115, a base station controller 120, and a core network 125 (the controller 120 may be integrated into the core network 125). The system 100 may support operation on multiple carriers (waveform signals of different frequencies).

The base stations 105 may wirelessly communicate with the mobile devices 115 via a base station antenna (not shown). The base stations 105 may communicate with the mobile devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (e.g., sectors 112-b-1, 112-b-2, 112-b-3, etc.) making up only a portion of the coverage area. The system 100 may include base stations 105 of different types (e.g., macro, micro, femto, and/or pico base stations). A macro base station may provide communication coverage for a relatively large geographic area (e.g., 35 km in radius). A pico base station may provide coverage for a relatively small geographic area (e.g., 2 km in radius), and a femto base station may provide communication coverage for a relatively smaller geographic area (e.g., 50 m in radius). There may be overlapping coverage areas for different technologies.

The mobile devices 115 may be dispersed throughout the coverage areas 110. The mobile devices 115 may be referred to as mobile stations, mobile devices, access terminals (ATs), user equipments (UEs), subscriber stations (SSs), or subscriber units. The mobile devices 115 may include cellular phones and wireless communications devices, but may also include personal digital assistants (PDAs), other handheld devices, netbooks, notebook computers, etc. Mobile devices 115 can also include many other types of devices capable of wireless communications.

As discussed in more detail below, in certain examples, a mobile device 115 may be configured to adaptively control the timing of wireless data transactions to reduce overall power consumption and prolong battery life. For example, at certain times the mobile device 115 may require more power to transmit wireless data than others. Factors affecting the amount of power used to transmit wireless data include, but are not limited to, the distance between the mobile device 115 and a serving base station 105, the channel quality between the mobile device 115 and the base station 105, interference from other devices, a type of modulation used to transmit the wireless data, and/or other relevant factors. If the cost to transmit the wireless data transaction in terms of power is currently high, the mobile device 115 may elect to postpone transmission of the wireless data transaction until the cost is lower.

The cost of transmitting a wireless data transaction in terms of power may be separately determined for separate transactions. When the mobile device 115 is in a state of active transmission, the power associated with transmitting a wireless data transaction may be determined based on the current power consumption of the transmitter of the mobile device 115. When the mobile device 115 is in an idle state, the power associated with transmitting a wireless data transaction may be derived from the receive power measured at the receiver during a scheduled power-up to check for paging messages.

The decision to postpone transmission of the wireless data transaction may be based at least in part on an identified priority of the wireless data transaction. For example, some high-priority wireless data transactions may be transmitted immediately regardless of the power cost. Similarly, some low-priority wireless data transactions may be postponed until the power cost of transmitting the transactions has fallen below a certain threshold.

Figure 2:
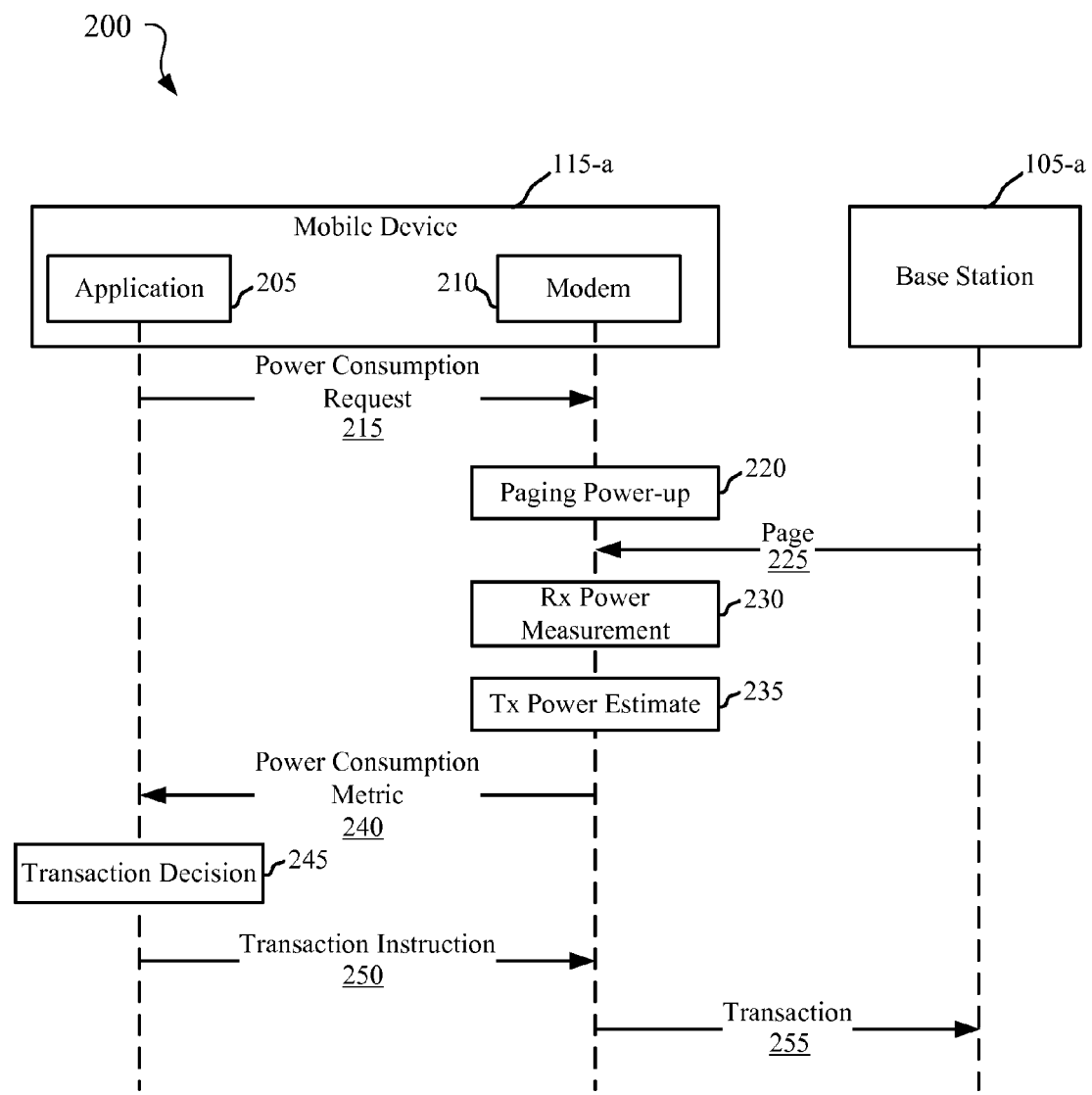
FIG. 2 shows a diagram of an example of communications between an application running on a mobile device, a modem of the mobile device, and a base station according to some embodiments.

FIG. 2 shows a block diagram illustrating an example of managing power consumption at a mobile device 115-b in an idle state through communications between an application 205 running on the mobile device 115-a, a modem 210 of the mobile device 115-a, and a base station 105-a. The mobile device 115-a and the base station 105-a may be respective examples of the mobile device 115 and base station 105 described above with reference to FIG. 1.

In the present example, the modem 210 of the mobile device 115-a may implement wireless communication between the mobile device 115-a and the base station 105-a. For example, the modem 210 may include a number of electronic components that collectively implement modulation and demodulation, encoding and decoding, baseband processing, a Radio Frequency (RF) frontend, a transmitter chain, and a receiver chain. The modem 210 may additionally include a number of electronic components configured to communicate with the application 205 over an application programming interface (API) associated with the modem 210.

The application 205 may be a piece of software running on hardware of the mobile device 115-a to implement a desired functionality. The application 205 may be a user application or a system application. The application 205 may generate a pending wireless data transaction. The pending wireless data transaction may be originated by a request from a user or automatically as part of the functionality implemented by the application 205. For example, the pending wireless data transaction may include data for transmission to the base station 105-a or to a web server via the base station 105-a. Additionally or alternatively, the pending wireless data transaction may include a request for data from the base station 105-a or from a web server via the base station 105-a.

In the present example, the application 205 may be configured to evaluate the power consumption impact of one or more wireless data transactions prior to sending the wireless data transaction to the modem 210 for transmission. In certain examples, this analysis may be performed for every wireless data transaction originating at the application 205. In other examples, the analysis may be performed only for wireless data transactions originating while the modem 210-a is in an idle state. The application 205 may receive a power consumption metric from the modem for each pending wireless data transaction being evaluated. The power consumption metric may indicate a relative cost of transmitting that wireless data transaction from the modem 210 at a current time. In certain examples, the power consumption metric received for a pending wireless data transaction may be weighed against a priority associated with the wireless data transaction, and a decision of whether or not to submit the pending wireless data transaction to the modem 210 for transmission may be made based on whether the priority of the transaction outweighs the power consumption metric for that transaction.

When the modem 210 of the mobile device 115-a is powered up and actively transmitting and receiving data, the power consumption metric for a pending wireless data transaction may be calculated based on at least an instantaneous measurement of the receive power at the modem. However, if the modem 210-a of the mobile device 115-a is in an idle state and not actively transmitting or receiving data, the transmitter and receiver may be turned off to conserve power. Powering up the transmitter or receiver from the idle state may consume power. Consequently, if the application 205 generates a new pending wireless data transaction while the mobile device 115-a is in the idle state, it may not be power efficient to wake up the transmitter or receiver to calculate the power consumption metric for a pending wireless data transaction or to transmit a low-priority wireless data transaction.

In light of these considerations, FIG. 2 illustrates a method of calculating power consumption metrics for wireless data transactions that originate while the mobile device 115-a is in an idle state by using measurements taken when the mobile device 115-a powers up the receiver of the modem 210 during a scheduled check for paging messages. In this way, the power consumption metrics may be determined for pending wireless transactions while the mobile device 115-a is in an idle state without powering up the transmitter or receiver beyond what is already scheduled to check for paging messages.

As shown in FIG. 2, the application 205 may a request 215 a power consumption metric for a pending wireless data transaction from the modem 210 over an application programming interface (API). The modem 210 may receive the request over the API and, if the modem 210 is in an idle state, buffer the request and wait to calculate the power consumption metric for the pending wireless data transaction until the mobile device 115-a powers up the receiver of the modem 210 during a scheduled check for paging messages 225 from the base station 105-a.

At the scheduled time, the receiver may power up 220 to check a physical downlink control channel (PDCCH) or another specified channel for paging messages 225. When the receiver wakes up, a receive power measurement 230 may be taken and stored. The receive power measurement may indicate the power of one or more signals received at the receiver at the current time from the base station 105-a. A paging message 225 directed to the mobile device 115-a may be optionally received by the mobile device 115-a, but it is not necessary for the mobile device 115-a to actually receive a paging message to measure the receive power.

Based on the measured receive power during the scheduled check for paging messages, a transmit power estimate 235 associated with transmitting the pending wireless data transaction at the current time may be obtained. The transmit power estimate 235 may be obtained, for example, using a mapping function implemented by a lookup table to map the measured instantaneous receive power of the receiver to an approximate instantaneous transmit power of the transmitter. In certain examples, the mapping function may include mapping the measured receive power to a transmit power, mapping the transmit power to an instantaneous cost of transmission, and mapping the instantaneous cost of transmission to a total cost of transmitting the pending wireless data transaction. Using the instantaneous transmit power of the transmitter, the transmit power estimate 235 may be generated, taking into account the size of the pending wireless data transaction, the data transmission rate of the transmitter or receiver, the channel quality between the mobile device 115-a and the base station 105-a, the amount and size of other pending wireless data transactions, the current state of the modem 210, and/or other relevant factors.

A power consumption metric 240 based on the transmit power estimate 235 for the pending wireless data transaction may be sent to the application 205 over the API. The power consumption metric 240 may include the transmit power estimate 235 for the pending wireless data transaction. Additionally or alternatively, the power consumption metric 240 may include one of a number of predetermined classifications (e.g., low, medium, high) associated with the relative power cost of transmitting the pending wireless data transaction at a current time.

The application 205 may receive the power consumption metric 240 from the modem over the API and make a decision 245 of whether to move forward with transmitting the pending wireless data transaction at the current time or postpone transmitting the pending wireless data transaction until the power consumption metric 240 for the transaction is lower. In making this decision, the application 205 may weigh a priority of the pending wireless data transaction against the cost of transmitting the pending wireless data transaction at the current time, as indicated by the power consumption metric 240. The priority of the pending wireless data transaction may be determined based on one or more of: an urgency of the transaction, the identity or type of the application 205, the identity or type of the transaction, the content of the transaction, and/or the like.

In example of FIG. 2, after weighing the priority of the pending wireless data transaction against the cost of transmission, the application 205 may choose to immediately submit the pending wireless data transaction to the modem 210, which may power up and submit the transaction 255 to the base station 105-a.

While the example of FIG. 2 shows the modem 210 waiting until the next scheduled power-up of the receiver to take a receive power measurement 230 and obtain a transmit power estimate 235, in alternative examples, the modem 210 may access stored receive power measurements from a preceding scheduled power-up of the receiver to obtain the transmit power estimate 235 and return the power consumption metric 240 to the application 205. In this way, the application 205 may receive power consumption metric 240 for the pending wireless data transaction sooner.

Figure 3A:
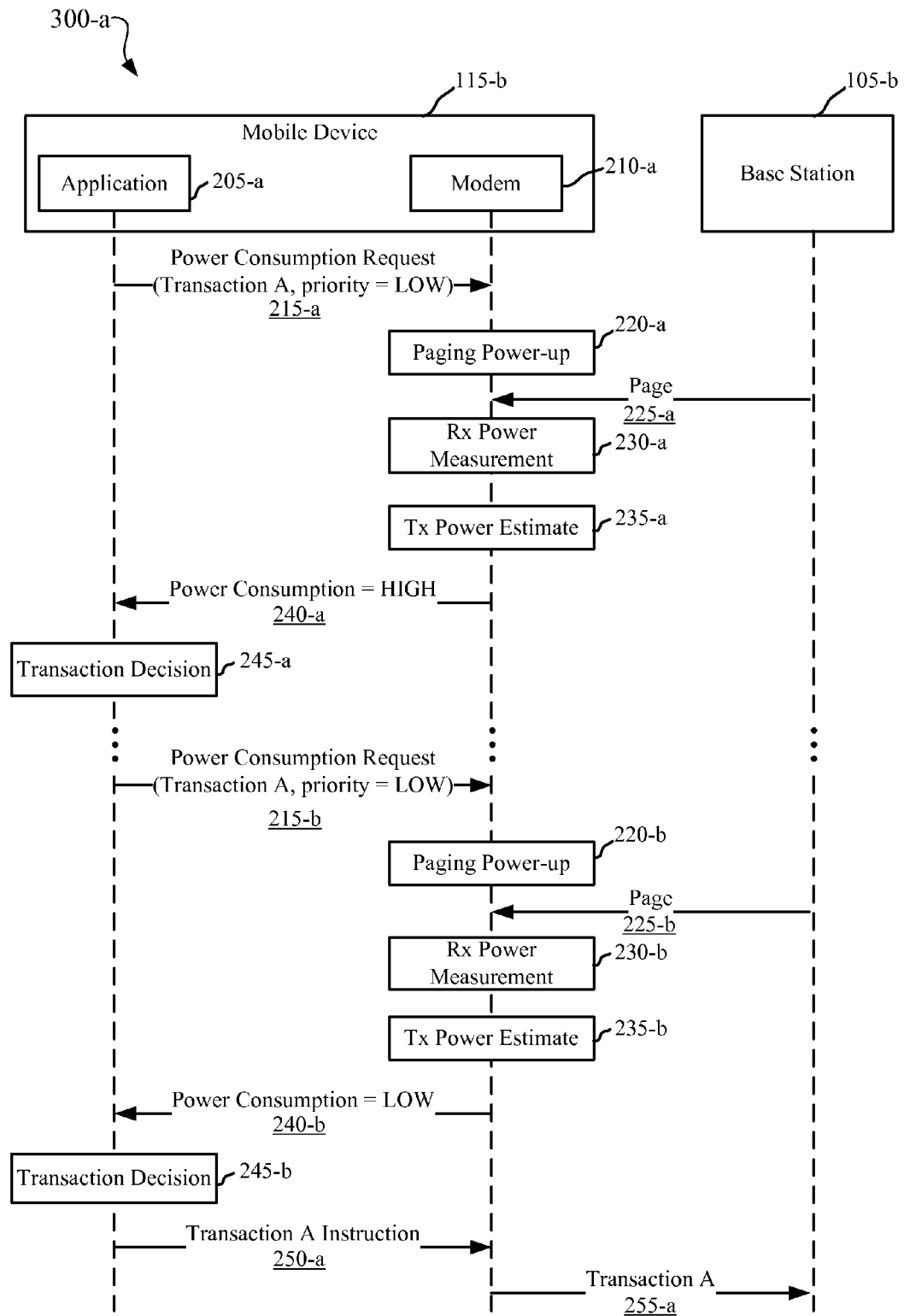
FIGS. 3A, 3B, and 3C show diagrams of an example of communications between an application running on a mobile device, a modem of the mobile device, and a base station according to some embodiments.
Figure 3B:
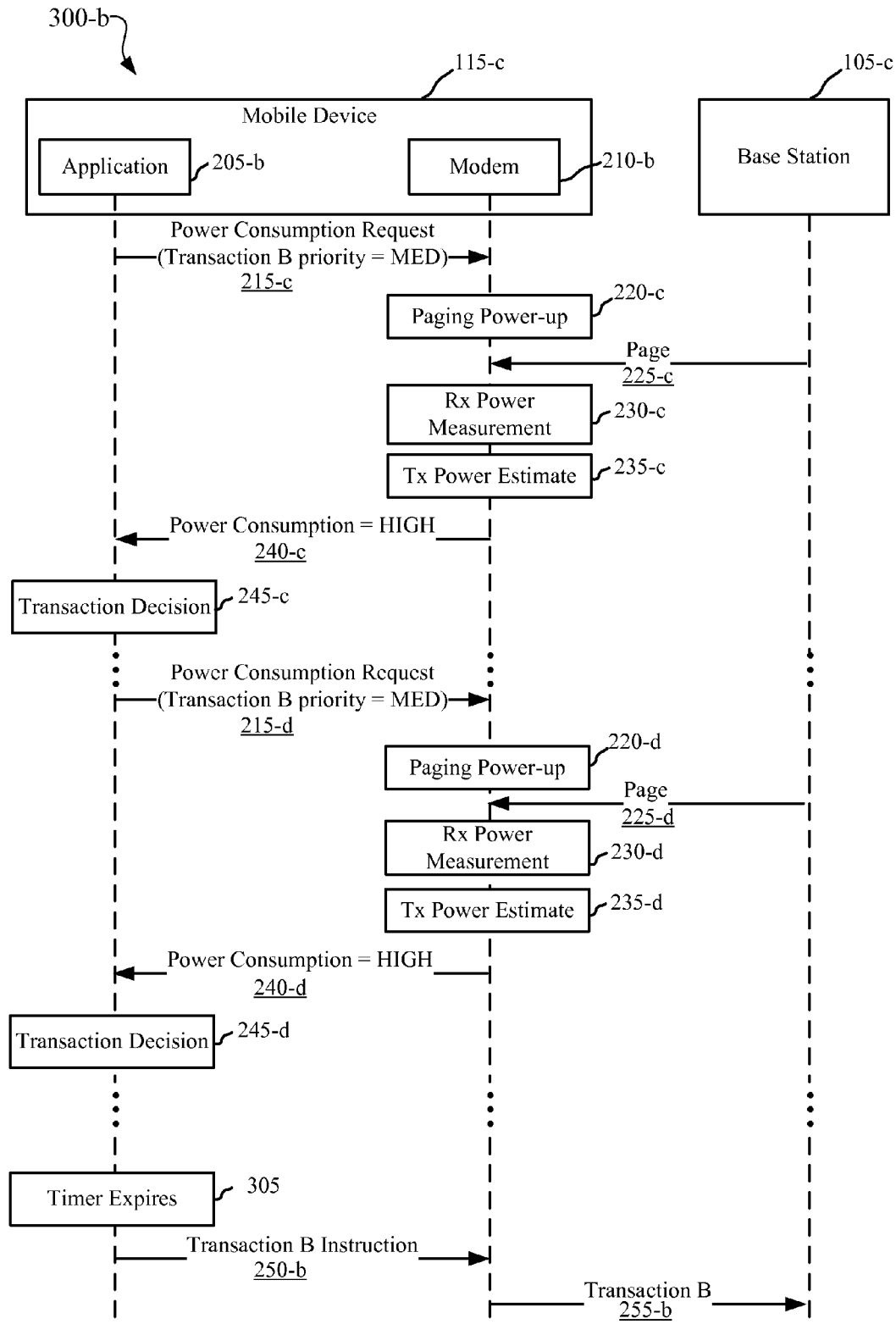
Figure 3C:
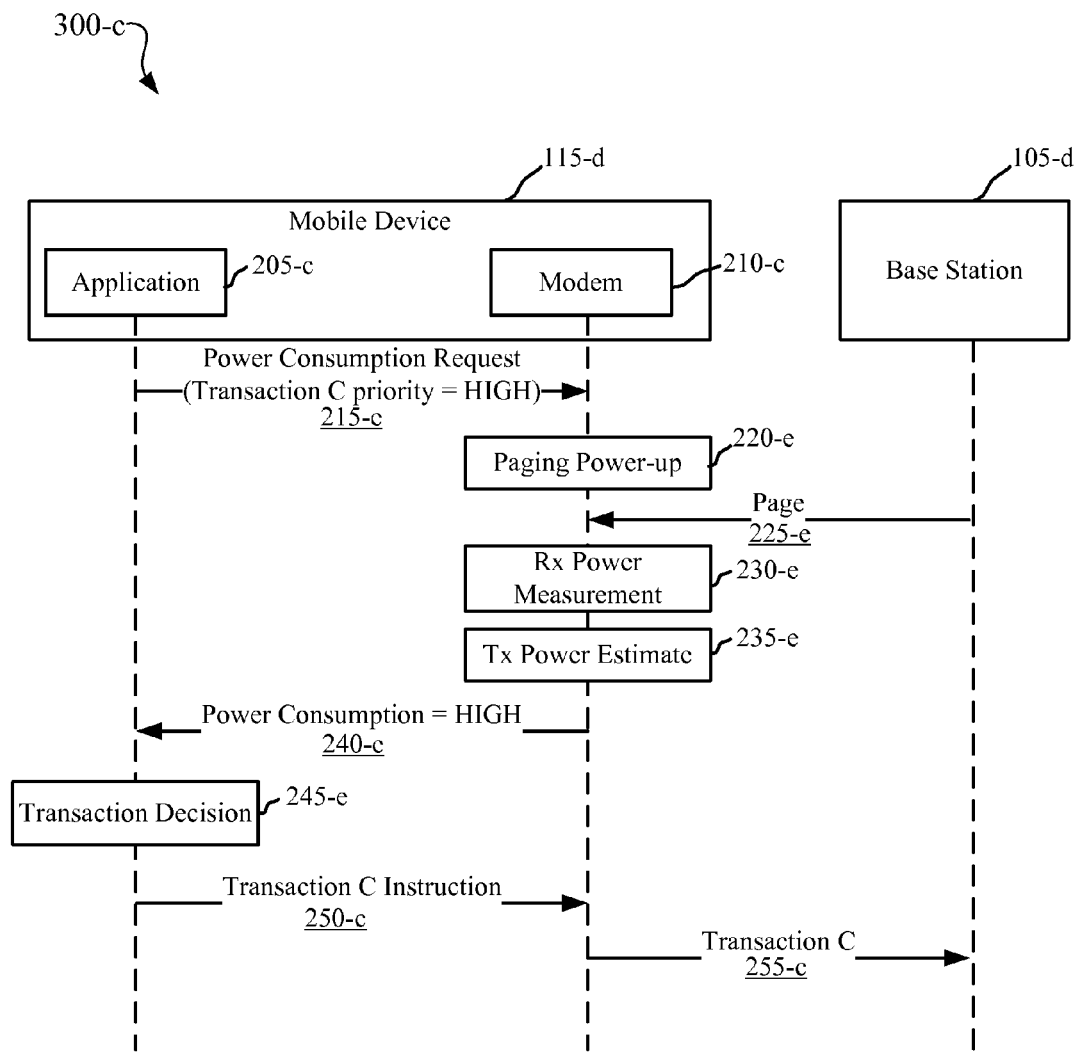

FIGS. 3A-3C show block diagrams illustrating different examples of managing power consumption at a mobile device 115 in an idle state through communications between an application 205 running on the mobile device 115, a modem 210 of the mobile device 115, and a base station 105. The mobile devices 115 and base stations 105 shown in FIGS. 3A-3C may be respective examples of one or more of the mobile devices 115 and base stations 105 described above with reference to the previous Figures.

In the example of FIG. 3A, the application 205-a may request 215-a a power consumption metric for transaction A from the modem 210-a over an API of the modem 210-a. Transaction A may be a pending wireless data transaction of the application 205-a, and may have a low priority. For example, application 205-a may be a news application and Transaction A may be a non-urgent automatic background update associated with updating news feeds associated with the application 205-a.

In certain examples, the priority may be assigned to Transaction A by the application 205-a. Alternatively, the priority of Transaction A may be inherently associated with the originating application 205-a, a transaction type associated with Transaction A, the content of Transaction A, the size of Transaction A, and/or other relevant factors. In certain examples, the application 205-a may transmit the priority of Transaction A to the modem 210-a as part of the power consumption request 215-a. The application 205-a may also transmit one or more parameters (e.g., size) for Transaction A to the modem 210-a, particularly if the parameters are relevant to estimating the power consumption associated with transmitting Transaction A at the modem 210-a.

The modem 210-a may receive the request 215-a over the API and, if the modem 210-a is in an idle state, buffer the request 215-a and wait until the mobile device 115-b powers up the receiver of the modem 210-a during a scheduled check for paging messages 225-a from the base station 105-b.

At the scheduled time, the receiver may power up 220-a to check a physical downlink control channel (PDCCH) or another specified channel for paging messages 225-a. When the receiver wakes up, a receive power measurement 230-a may be taken and stored, and a paging message 225-a directed to the mobile device 115-b may optionally be received.

Using a mapping function, the measured receive power of the receiver may be converted to an instantaneous power consumption of the transmitter. Based on the instantaneous power consumption of the transmitter and the size of Transaction A, a transmit power estimate 235-a associated with transmitting Transaction A at the current time may be obtained. A power consumption metric 240-a based on transmit power estimate 235-a for the pending wireless data transaction may be sent to the application 205-a over the API. The power consumption metric 240-a may indicate that the estimated power cost of transmitting Transaction A at the current time is high.

The application 205-a may receive the power consumption metric 240-a from the modem over the API, weigh the high estimated power cost of transmitting Transaction A at the current time against the low priority of Transaction A to make a decision 245-a to postpone transmitting Transaction A until the power cost of transmitting Transaction A is lower.

The application 205-a may submit another request 215-b for a power consumption metric for Transaction A to the modem 210-a. Alternatively, the modem 210-a may store the original request 215-a and choose to reevaluate the power cost of Transaction A at the later time based on the expiration of a timer or another trigger. Thus, when the receiver powers up 220-b to check for new paging messages 225-b, a new measurement 230-b of the receive power may be performed and a new transmit power estimate 235-b based on the new receive power measurement 230-b may be obtained.

At this later time, the mobile device 115-b may have moved closer to base station 105-b or otherwise experienced an increase in channel quality. Accordingly, a new power consumption metric 240-b may be transmitted to the application 205-a over the API, indicating that the estimated power consumption associated with transmitting Transaction A is now low. Consequently, the application 205-a may weigh the low priority of Transaction A against the low cost of transmitting Transaction A and make the decision 245-b to instruct the modem 210-a over the API to transmit Transaction A. The modem 210-a may then transmit Transaction A to the base station 105-b for processing by the base station 105-b and/or forwarding to a web server.

In the example of FIG. 3B, the application 205-b may request 215-c a power consumption metric for transaction B from the modem 210-b over an API of the modem 210-b. Transaction B may be a pending wireless data transaction of the application 205-b, and may have a medium priority. For example, application 205-a may be an email client and Transaction B may be an automatic send/receive request associated with retrieving new email from a server.

The modem 210-b may receive the request 215-c over the API and, if the modem 210-a is in an idle state, buffer the request 215-c and wait until the mobile device 115-c powers up the receiver of the modem 210-b during a scheduled check for paging messages 225-c from the base station 105-c.

At the scheduled time, the receiver may power up 220-c to check a physical downlink control channel (PDCCH) or another specified channel for paging messages 225-c. When the receiver wakes up, a receive power measurement 230-c may be taken and stored, and a paging message 225-c directed to the mobile device 115-c may optionally be received.

Using a mapping function, the measured receive power of the receiver may be converted to an instantaneous power consumption of the transmitter. Based on the instantaneous power consumption of the transmitter and the size of Transaction B, a transmit power estimate 235-c associated with transmitting Transaction B at the current time may be obtained. A power consumption metric 240-c based on transmit power estimate 235-c for Transaction C may be sent to the application 205-b over the API. The power consumption metric 240-c may indicate that the estimated power cost of transmitting Transaction B at the current time is relatively high.

The application 205-a may receive the power consumption metric 240-a from the modem over the API, weigh the high estimated power cost of transmitting Transaction B at the current time against the medium priority of Transaction B to make a decision 245-c to postpone transmitting Transaction B until the power cost of transmitting Transaction B is lower.

The application 205-b may submit another request 215-d for a power consumption metric for Transaction A to the modem 210-b. Alternatively, the modem 210-b may store the original request 215-c and choose to reevaluate the power cost of Transaction B at the later time based on the expiration of a timer or another trigger. Thus, when the receiver powers up 220-d at a later time to check for new paging messages 225-d, a new measurement 230-d of the receive power may be performed and a new transmit power estimate 235-d based on the new receive power measurement 230-d may be obtained. A new power consumption metric 240-d may be transmitted to the application 205-a over the API, indicating that the estimated power consumption associated with transmitting Transaction B is still high. Consequently, the application 205-b may again weigh the medium priority of Transaction B against the high cost of transmitting Transaction B, and make the decision to postpone the transmission of Transaction B again.

As further shown in FIG. 3B, if Transaction B has not yet been submitted to the modem for transmission by the time a timer 305 expires, the application 205-b may instruct 250-b the modem 210-b to transmit Transaction B regardless of the associated power cost. In certain examples, the timer 305 may override decisions to postpone transactions based on power only for transactions of a certain priority (e.g., only medium or low priority transactions). Alternatively, timers 305 may be used to override postponement decisions for all types of wireless data transactions. In still other examples, the priority of the pending wireless transaction may be increased in response to a determination that the timer has expired, and the pending wireless transaction may be transmitted based at least in part on a determination that the increased priority of the transaction outweighs the power consumption metric. In certain examples, different timer values may be associated with transactions of different priorities.

In the example of FIG. 3C, the application 205-c may request 215-e a power consumption metric for transaction C from the modem 210-c over an API of the modem 210-c. Transaction C may be a pending wireless data transaction of the application 205-c, and may have a high priority. For example, application 205-c may be a web browser or messaging application, and Transaction C may be a user-initiated request for a web page or message transmission.

The modem 210-c may receive the request 215-e over the API. If the modem 210-c is in an idle state, the modem 210-c may buffer the request 215-d and wait until the mobile device 115-d powers up the receiver of the modem 210-c during a scheduled check for paging messages 225-c from the base station 105-c.

At the scheduled time, the receiver may power up 220-e to check a physical downlink control channel (PDCCH) or another specified channel for paging messages 225-e. When the receiver wakes up, a receive power measurement 230-e may be taken and stored, and a paging message 225-e directed to the mobile device 115-d may optionally be received.

Using a mapping function, the measured receive power of the receiver may be converted to an instantaneous power consumption of the transmitter. Based on the instantaneous power consumption of the transmitter and the size of Transaction C, a transmit power estimate 235-e associated with transmitting Transaction C at the current time may be obtained. A power consumption metric 240-e based on the transmit power estimate 235-e for Transaction C may be sent to the application 205-c over the API. The power consumption metric 240-e may indicate that the estimated power cost of transmitting Transaction C at the current time is high.

The application 205-a may receive the power consumption metric 240-a from the modem over the API, weigh the high estimated power cost of transmitting Transaction C at the current time against the high priority of Transaction C to make a decision 245-e to immediately transmit Transaction C. Consequently, the application 205-c may issue an instruction 250-c to the modem 210-c to transmit Transaction C 255-c to the base station 105-d.

In alternative examples, the application 205-a, upon determining that Transaction C has a high priority, may forego the process of requesting a power consumption metric and determining whether to postpone transmitting Transaction C based on the power consumption metric. Rather, the application 205-a may immediately submit each high-priority transaction to the modem 210-c for immediate transmission.

Figure 4:
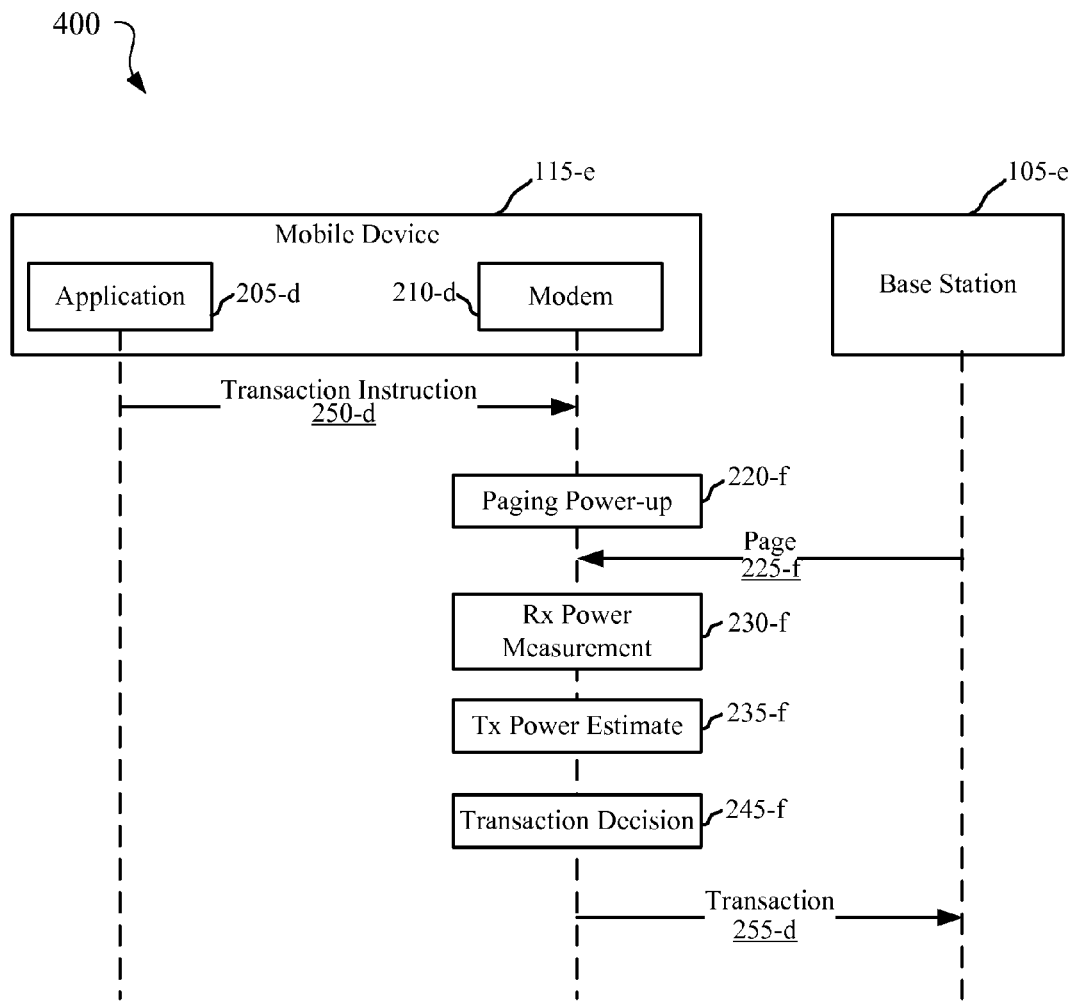
FIG. 4 shows a diagram of an example of communications between an application running on a mobile device, a modem of the mobile device, and a base station according to some embodiments.

FIG. 4 shows a block diagram illustrating another example of managing power consumption at a mobile device 115-e in an idle state through communications between an application 205-d running on the mobile device 115, a modem 210-d of the mobile device 115-e, and a base station 105-e. The mobile device 115-e and base station 105-e shown in FIG. 4 may be respective examples of one or more of the mobile devices 115 and base stations 105 described above with reference to the previous Figures.

In the example of FIG. 4, the decision of whether to postpone or immediately transmit pending wireless data transactions may be made at the modem 210-d. Thus, the application 205-d may generate a wireless data transaction and submit an instruction 250-d to the modem 210-d to transmit the wireless data transaction. The modem 210-d may store the wireless data transaction in a buffer until a transmission decision is made for the transaction. The modem 210-d may wait to calculate the power consumption metric for the pending wireless data transaction until the mobile device 115-e powers up 220-f the receiver of the modem 210-d during a scheduled check for paging messages 225-f from the base station 105-e.

At the scheduled time, the receiver may power up 220-f to check a physical downlink control channel (PDCCH) or another specified channel for paging messages 225-f. When the receiver wakes up, a receive power measurement 230-f may be taken and stored. The receive power measurement 230-f may indicate the signal strength of a signal received by the receiver at the current time from the base station 105-e. A paging message 225-f directed to the mobile device 115-e may be optionally received by the mobile device 115-e, but it is not necessary for the mobile device 115-e to actually receive a paging message to measure the receive power.

Based on the receive power measurement 230-f made during the scheduled check for paging messages, a transmit power estimate 235-f associated with transmitting the pending wireless data transaction at the current time may be obtained using a mapping function and one or more parameters of the pending wireless data transaction.

The modem 210-d may make a decision 245-f of whether to move forward with transmitting the pending wireless data transaction at the current time or postpone transmitting the pending wireless data transaction until the transmit power estimate 235-f for the pending wireless data transaction is lower. In making this decision, the modem 210-d may weigh a priority of the pending wireless data transaction against the cost of transmitting the pending wireless data transaction at the current time, as indicated by the transmit power estimate 235-f. In certain examples, the modem 210-d may receive the priority of the pending wireless data transaction from the application 205-d. Additionally or alternatively, then modem 210-d may apply one or more rules to the content, format, type, or size of the pending wireless data transaction to determine the priority.

As shown in FIG. 4, the modem 210-d may determine to transmit 255-d the wireless data transaction to the base station 105-e immediately. Alternatively, the modem 210-d may determine that the transaction power estimate 235-f associated with transmitting the pending wireless data transaction outweighs the priority of the pending wireless data transaction and keep the pending wireless data transaction in the buffer until the modem 210-d that the transmit power estimate 235-f has lowered or a timer associated with the pending wireless data transaction expires.

While the example of FIG. 4 shows the modem 210-d waiting until the next scheduled power-up of the receiver to take a receive power measurement 230-f and obtain a transmit power estimate 235-f, in alternative examples, the modem 210-f may access stored receive power measurements 230-f from a preceding scheduled power-up of the receiver to obtain the transmit power estimate 235-f In this way, the modem may make a faster initial decision 245-f of whether to postpone the transmission of the pending wireless data trans action.

FIG. 5 shows a diagram of an example of a decision table 500 for determining whether to conduct a pending wireless data transaction at a given time. Different power consumption metrics (classified into the low-granularity categories of low cost, medium cost, and high cost) are represented along the x-axis, and different wireless data transaction priority levels are represented along the y-axis. The table 500 indicates whether a data transaction of a given priority level with a given power consumption metric is to be immediately transmitted ("Y") or postponed ("N").

While the decision table 500 relies on two variables, it will be understood that additional variables may be incorporated into the decision table 500. For example, in addition to the priority of the wireless data transaction and the power consumption metric, the decision of whether to postpone transmission of the wireless data transaction may be further based on one or more of: the identity of the application associated with the wireless data transaction, the size of the wireless data transaction, the content of the wireless data transaction, the identity of a base station or an intended recipient of the wireless data transaction, whether the transmitter or the receiver of the modem is powered on or off, whether other wireless data transactions are scheduled for transmission within a given window of time, a battery level of the mobile device, a time since the last battery recharge of the mobile device, a congestion level of the network determined by the mobile device, an amount of available memory at the mobile device, a processor utilization of the mobile device, time of day, security parameters, and/or other desired or relevant parameters.

Additionally, while the decision table 500 of FIG. 5 is based on a relatively low granularity (e.g., low, medium, high) of the priority level and power consumption metric of the pending wireless data transaction, higher or lower granularity may be used.

In certain examples, a user of the mobile device may be permitted to enter one or more rules associated with determining whether to postpone transmitting a wireless data transaction based on at least the power consumption metric associated with the wireless data transaction. In certain examples, the mobile device may provide a user interface through which the user may add, modify, or delete such rules. In these scenarios, the decision table 500 may be updated to reflect the user-selected rules.

Figure 6:
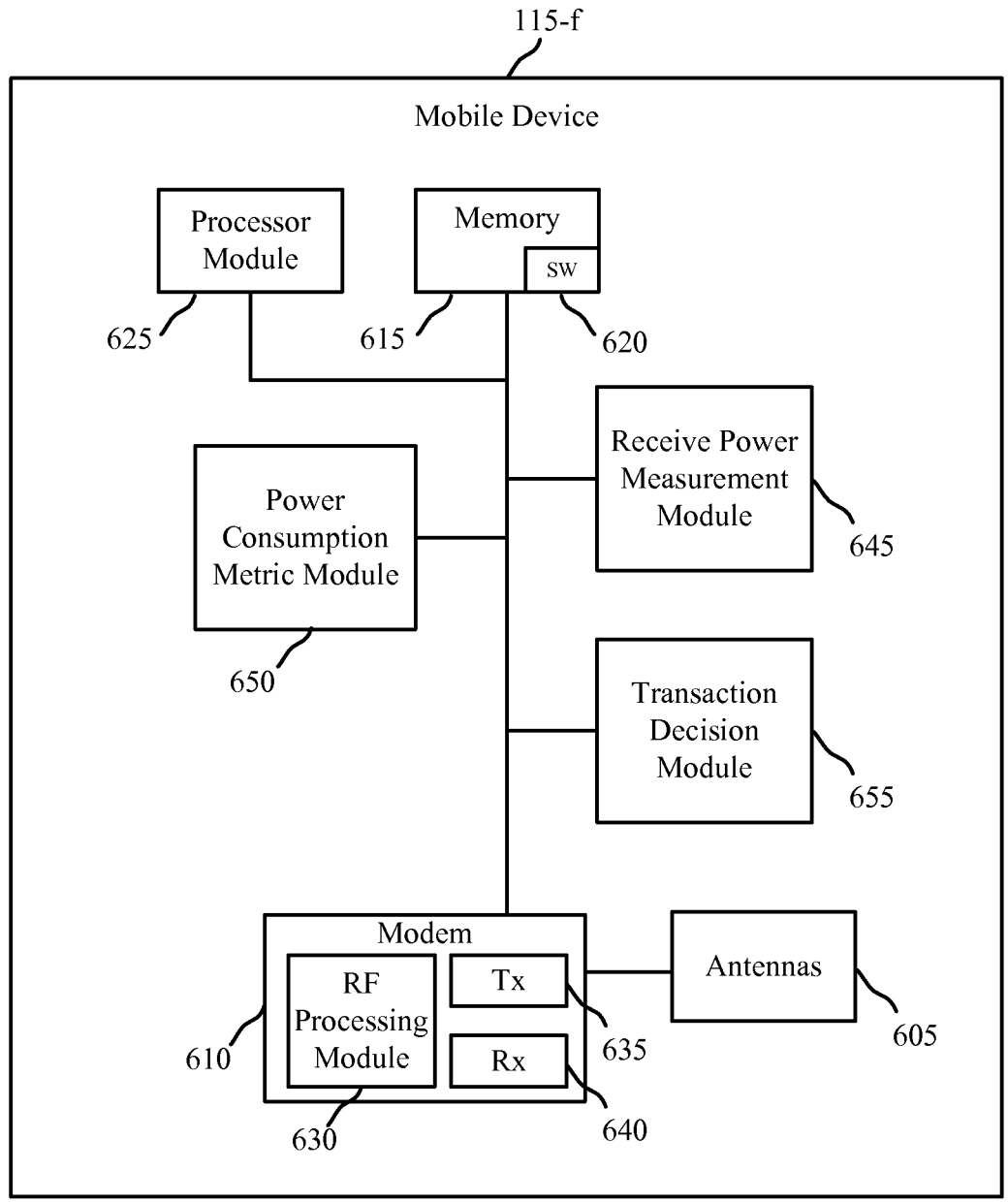
FIG. 6 shows a block diagram of an example of a mobile device according to some embodiments.

FIG. 6 is a block diagram 600 of an example of a mobile device 115-f. The mobile device 115-f may be an example of one or more of the mobile devices 115 described above with reference to the previous Figures. The mobile device 115-f may be configured as one or more of: a personal computer (e.g., laptop computer, netbook computer, tablet computer, etc.), a cellular telephone, a PDA, a digital video recorder (DVRs), an internet appliance, a gaming console, an e-reader, etc. The mobile device 115-f may have an internal power supply (not shown), such as a battery, to facilitate mobile operation.

The mobile device 115-f may include antennas 605, a modem 610, a memory 615, and a processor module 625, which each may be in communication, directly or indirectly, with each other (e.g., via one or more buses). The modem 610 may be configured to implement bidirectional wireless communications via the antennas 605 and/or one or more wired or wireless links, with one or more networks, as described above. For example, the modem 610 may be configured to communicate bi-directionally with one or more of the base stations 105 described above with reference to previous Figures. The modem 610 may include an RF processing module 630, a transmitter 635, and a receiver 640. These components may collectively modulate packets and provide the modulated packets to the antennas 605 for transmission, and demodulate packets received from the antennas 605. While the mobile device 115-f may include a single antenna, alternatively the mobile device 115-f may include multiple antennas 605 for multiple links.

The memory 615 may include random access memory (RAM) and read-only memory (ROM). The memory 615 may store computer-readable, computer-executable software code 620 containing instructions that are configured to, when executed, cause the processor module 625 to perform various functions described herein (e.g., measuring receive power, estimating power consumption metrics, determining whether to transmit a pending wireless data transaction at a current time, etc.). Alternatively, the software 620 may not be directly executable by the processor module 625 but be configured to cause a computer (e.g., when compiled and executed) to perform functions described herein.

The processor module 625 may include an intelligent hardware device, e.g., a central processing unit (CPU), a microcontroller, an application specific integrated circuit (ASIC), or other hardware device configured to execute code and control the memory 615.

According to the architecture of FIG. 6, the mobile device 115-f may further include a receive power measurement module 625, a power consumption metric module 630, and a transaction decision module 655. In certain examples, one or more aspects of these modules 625, 630, 635 may be implemented by the processor module 625 executing code 620 stored by memory 615, the modem 610, or a combination thereof. Additionally or alternatively, one or more aspects of the receive power measurement module 625, the power consumption metric module 630, or the transaction decision module 655 may be implemented by one or more application-specific integrated circuits (ASICs) adapted to perform some or all of the applicable functions in hardware. In additional or alternative implementations, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-$f$.

The receive power measurement module 625 may be configured to measure, during a scheduled power-up of the modem 610 associated with receiving paging messages, a receive power associated with the receiver 640. The measured receive power may be an amount of power (e.g., in dBm) associated with a signal received at the receiver 640 while listening for paging messages from a base station during an allotted time slot.

The power consumption metric module 650 may be configured to estimate a power consumption metric associated with transmitting a pending wireless data transaction at the transmitter 635 based on the receive power measured at the receive power measurement module 645. For example, as described above, a predetermined mapping function may be used to convert the measured receive power to an estimated instantaneous power consumption of the transmitter 635.

Using the estimated instantaneous power of the transmitter and known parameters (e.g., size, type, etc.) of the pending wireless data transaction, the power consumption metric module 650 may estimate an amount of power that would be expended by the transmitter 635 if the pending wireless data transaction were transmitted under current conditions. The power consumption metric associated with the pending wireless data transaction may reflect this estimated amount of power for the transaction. In certain examples, the power consumption metric may include the estimated amount of power for transmitting the transaction under current conditions. Additionally or alternatively, the power consumption metric may include a classification of the estimated amount of power for transmitting the transaction, where the classification is selected from a finite set (e.g., low, medium, high).

In certain examples, the measurement of the receive power of the receiver 640 during the scheduled check for paging messages and the mapping of the measured receive power of the receiver 640 to an estimated power consumption of the transmitter 635 may occur each time the modem 610 listens for paging messages. For example, the estimated power consumption of the transmitter 635 may be determined in order to ascertain an amount of power to allocate to the transmitter 635 when responding to paging messages received by the modem 610 from a base station. However, the measured receive power of the receiver 640 and estimated power consumption of the transmitter 635 determined during the check for paging messages may additionally be used to determine the estimated power consumption metric for the pending wireless data transaction.

The transaction decision module 655 may be configured to determine whether to transmit the pending wireless data transaction during a first period of time (e.g., within a given window of time with respect to measurement of the receive power). The transaction decision module 655 may determine whether to immediately transmit the pending wireless data transaction or postpone transmission of the pending wireless data transaction. This determination may be made by comparing the power consumption metric estimated at the power consumption metric module 650 with a priority associated with the pending wireless data transaction. In the case where transmission of the pending wireless data transaction is postponed, the power consumption metric module 650 may estimate a second power consumption metric for the pending wireless data transaction during a second period of time after the first period of time, and the transaction decision module 655 may then determine whether to transmit the pending wireless data transaction during the second period of time based on the second power consumption metric.

Figure 7:
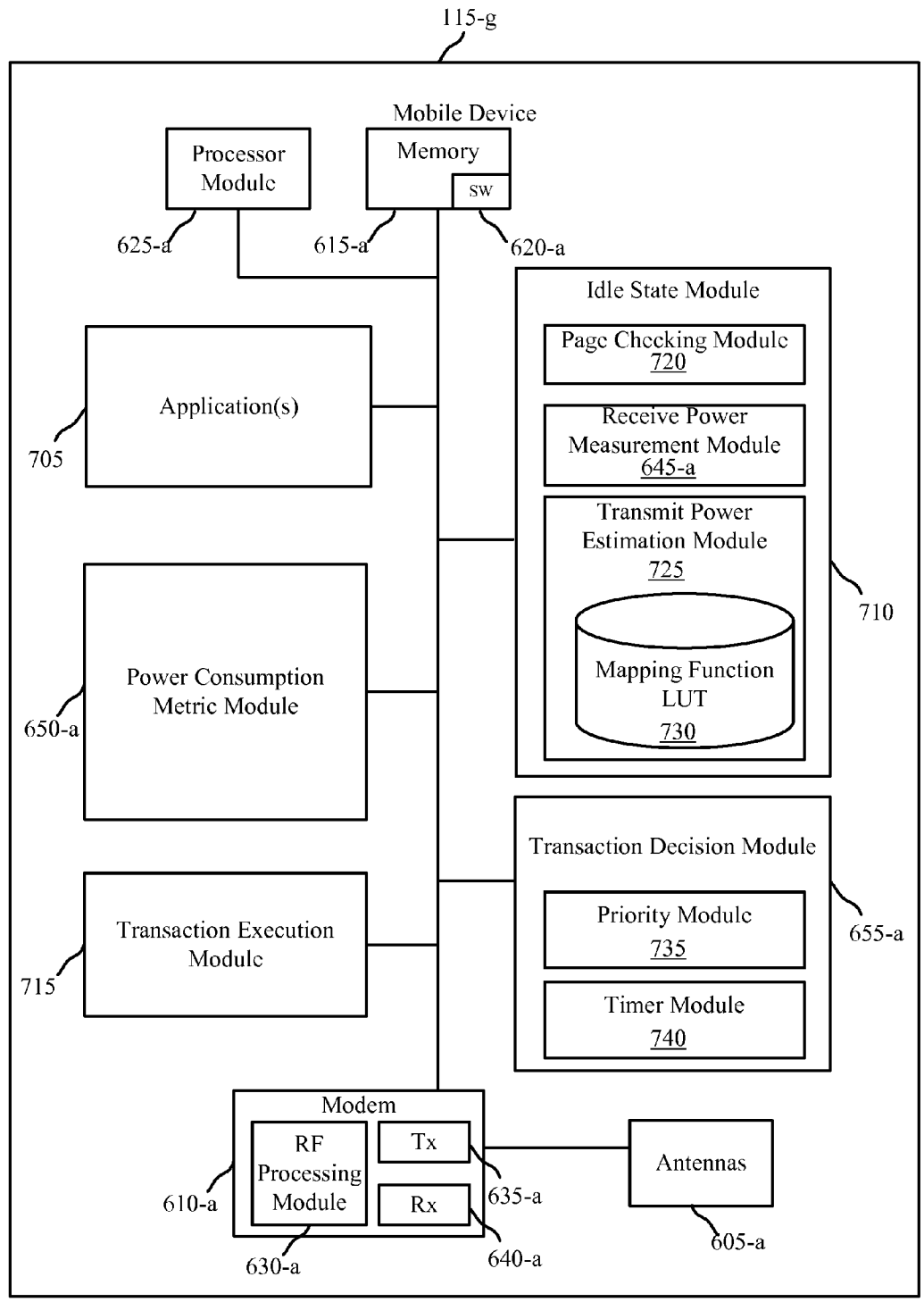
FIG. 7 shows a block diagram of an example of a mobile device according to some embodiments.

FIG. 7 is a block diagram of another example of a mobile device 115-$g$. The mobile device 115-$g$ may be an example of one or more of the mobile devices 115 described above with reference to the previous Figures. Similar to the mobile device 115-$f$ of FIG. 6, the mobile device 115-$g$ of the present example may include one or more antennas 605-$a$, a modem 610-$a$, memory 615-$a$ containing computer readable program code 620-$a$, a processor module 625-$a$, a receive power measurement module 645-$a$, a power consumption metric module 650-$a$, and a transaction decision module 655-$a$. Additionally, the mobile device 115-$g$ may include at least one application 705, an idle state module 710, and a transaction execution module 715.

In the present example, the application 705 may be implemented by the processor module 625-$a$ and the memory 615-$a$. The application 705 may generate a pending wireless data transaction (e.g., a request for data from a web server) for transmission to a base station by the modem 610-$a$. The application 705 may communicate with the power consumption metric module 650-$a$, the transaction decision module 655-$a$, the transaction execution module 715, and/or the modem 610-$a$ over an API to indicate that the pending wireless data transaction has been generated. In certain examples, upon generating the pending wireless data transaction, the application 705 may request a power consumption metric for the pending wireless data transaction over the API.

The idle state module 710 may manage an idle state entered by the modem 610-$a$ during periods of inactivity. When wireless data is not being actively transmitted or received, the idle state module 710 may power down at least the transmitter 635-$a$ and the receiver 640-$a$ of the modem 610-$a$ to conserve battery power. The idle state module 710 may include a page checking module 720 configured to periodically power up the receiver 640-$a$ of the modem 610-$a$ during the idle state to check for scheduled paging messages from a base station. During these schedule power-ups, the receive measurement module 645-$a$ may measure the receive power of the receiver 640-$a$. The transmit power estimation module 725 may use a mapping function lookup table 730 to estimate a power consumption of the transmitter 635-$a$ under current channel conditions based on the measured receive power of the receiver during the scheduled check for paging messages.

The power consumption metric module 650-$a$ may evaluate, for pending wireless transactions generated at the application 705, a power consumption metric indicating a relative cost of transmitting the pending wireless transaction at a current time. If the modem 610-$a$ is in a state of actively transmitting or receiving data, the power consumption metric may be determined by measuring a current expenditure of power at the transmitter 635-$a$ and the receiver 640-$a$ and extrapolate an estimated cost of transmitting the pending wireless transaction under current channel conditions. However, if the modem 610-$a$ is in the aforementioned idle state, it may not be cost-effective to power up the transmitter 635-$a$ or receiver 640-$a$ for the purpose of estimating the power cost of transmitting the pending wireless data transaction.

Accordingly, when the modem 610-$a$ is in the idle state, the power consumption metric module 650-$a$ may determine the power consumption metric for the pending wireless data transaction using the transmit power estimated by the transmit power estimation module 725 during a scheduled power-up of the receiver 640-$a$ to check for paging messages.

One purpose of the receive power measurement module 645-$a$ and the transmit power estimation module 725 of the idle state module 710 may be to determine how much power to allocate to the transmitter 635-$a$ in the event that a response to a paging message is needed or the modem 610-$a$ returns to a state of actively transmitting and receiving data. However, the power consumption metric module 650-a may also use the transmit power estimated by the transmit power estimation module 725 to generate the power consumption metric for the pending wireless transaction generated by the application 705 while the modem 610-a is in the idle state. In certain examples, the power consumption metric module 650-a may access a stored estimated transmit power performed for the most recent scheduled power-up of the receiver 640-a to check for paging messages. Additionally or alternatively, the power consumption metric module 650-a may wait for the next scheduled power-up of the receiver 640-a to generate the power consumption metric for the pending wireless data transaction based on a fresh receive power measurement and transmit power estimate from the idle state module 710.

In certain examples, the power consumption metric may include a numerical representation (e.g., in dBm) of the estimated amount of power that would be consumed by the transmitter 635-a and receiver 640-a to conduct the pending wireless transaction at the current time or during a current period of time. Additionally or alternatively, the power consumption metric may include a low-granularity classification (e.g., low, medium, high) of the estimated amount of power that would be consumed by the transmitter 635-a and receiver 640-a to conduct the pending wireless transaction at the current time or during a current period of time.

The transaction decision module 655-a may use the power consumption metric to determine whether to transmit the pending wireless data transaction during a current time period or postpone transmission of the pending wireless data transaction to a later time period. In certain examples, the transaction decision module 655-a may be a component of the application 705. Alternatively, the transaction decision module 655-a may be a component of the modem 610-a. The transaction decision module 655-a may include a priority module 735 configured to determine a priority associated with the pending wireless data transaction. The priority module 735 can also be configured to weigh the priority of the pending wireless data transaction against the power consumption metric for the transaction to determine whether to transmitting the pending wireless transaction at a current time or postpone transmission of the transaction until the power consumption metric for the transaction is lower. In some embodiments, the transaction decision module 655-a can be configured to throttle on and off transactions. Throttling can be based on various parameters such as those discussed herein with respect to the transaction decision module operational characteristics.

The transaction decision module 655-a may also include a timer module 740. In certain examples, the timer module 740 may implement a timer for a pending wireless data transaction. The timer may commence when the pending wireless data transaction is generated by the application 705. When the timer expires, the priority of the pending wireless data transaction may be elevated. In certain examples, when the timer for a transaction expires, the transaction may be transmitted immediately, irrespective of the priority of the transaction or the power consumption metric for the transaction. In additional or alternative examples, pending wireless data transactions of different sizes, types, or priorities may have different predetermined timer values.

In certain examples, if the transaction decision module 655-a determines not to transmit the pending wireless data transaction during a current period of time, the transaction idle state module may power down the transmitter 635 and receiver 640 of the modem 610 and return to the idle state.

The transaction execution module 715 may be configured to receive the pending wireless data transaction and submit the transaction to the modem 610-a for wireless transmission in accordance with the decision of the transaction decision module 655-a. In certain examples, one or more components of the transaction execution module 715 may be implemented by the application 705. Additionally or alternatively, one or more components of the transaction execution module 715 may be implemented by the modem 610-a.

Figure 8:
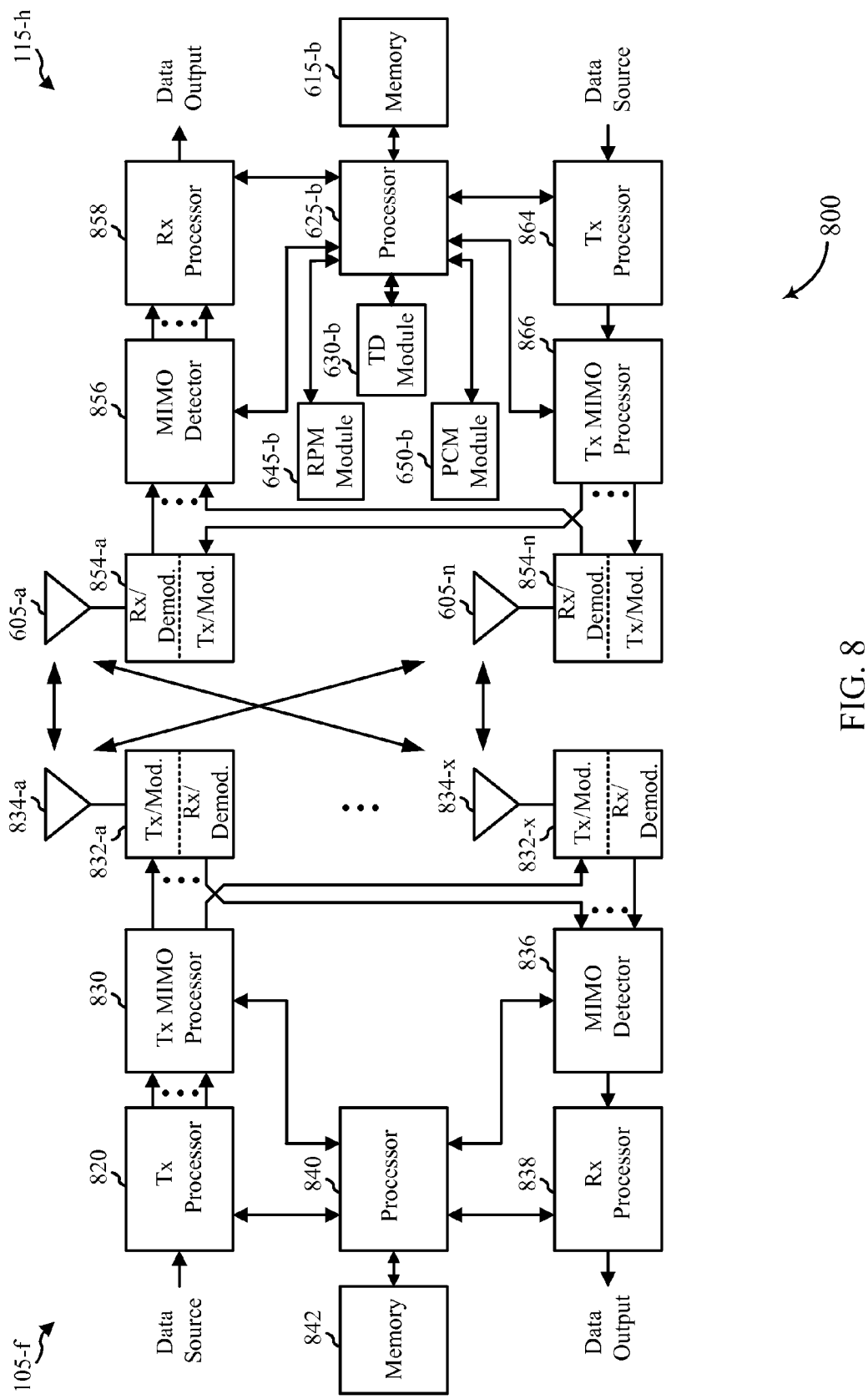
FIG. 8 shows a block diagram of an example of a wireless communications system including a base station and a mobile device according to some embodiments.

FIG. 8 is a block diagram of a system 800 including a base station 105-f and a mobile device 115-h. This system 800 may be an example of one or more of the systems 100, 200, 300, 400 described above. The base station 105-f may be equipped with antennas 834-a through 834-x, and the mobile device 115-h may be equipped with antennas 852-a through 852-n. At the base station 105-f, a transmit processor 820 may receive data from a data source.

The transmit processor 820 may process the data. The transmit processor 820 may also generate reference symbols, and a cell-specific reference signal. A transmit (TX) Multiple-Input Multiple-Output (MIMO) processor 830 may perform spatial processing (e.g., precoding) on data symbols, control symbols, and/or reference symbols, if applicable, and may provide output symbol streams to the transmit modulators 832-a through 832-x. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink (DL) signal. In one example, DL signals from modulators 832-a through 832-x may be transmitted via the antennas 834-a through 834-x, respectively.

At the mobile device 115-h, the mobile device antennas 650-a through 605-n may receive the DL signals from the base station 105-f and may provide the received signals to the demodulators 854-a through 854-n, respectively. The demodulators 854 may be components of a modem (e.g., modem 610 of FIG. 6 or FIG. 7). Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-a through 854-n, perform MIMO detection on the received symbols if applicable, and provide detected symbols. A receive processor 858 may process (e.g., demodulate, deinterleave, and decode) the detected symbols, providing decoded data for the mobile device 115-h to a data output, and provide decoded control information to a processor 625-b, or memory 615-b.

On the uplink (UL), at the mobile device 115-h, a transmit processor 864 may receive and process data from a data store. The transmit processor 864 may also generate reference symbols for a reference signal. The symbols from the transmit processor 864 may be precoded by a transmit MIMO processor 866 if applicable, further processed by the modulators 854-a through 854-n (e.g., for SC-FDMA, etc.), and be transmitted to the base station 105-f in accordance with the transmission parameters received from the base station 105-f. The modulators 854 may be components of a modem consistent with the principles described above.

In certain examples, data for transmission (i.e., a wireless data transaction) may be generated at the mobile device 115-h while the transmitters and modulators 854 are powered down in an idle state. A receive power measurement module 645-b may, as described above with reference to previous Figures, measure a receive power associated with the receiver and/or demodulator 854 during a scheduled power-up of the modem associated with a check for paging messages from the base station 105-*f*. A power consumption metric module 650-*b* may estimate a power consumption metric associated with transmitting the wireless data transaction from the transmitter during a current period of time based on the measured receive power associated with the receiver. A transaction decision module 655-*b* may determine whether to transmit the pending wireless data transaction at the transmitter during the current period of time based at least in part on the estimated power consumption metric.

At the base station 105-*f*, the UL signals from the mobile device 115-*h* may be received by the antennas 834, processed by the demodulators 832, detected by a MIMO detector 836 if applicable, and further processed by a receive processor. The receiver processor 838 may provide decoded data to a data output and to the processor 840.

The components of the mobile device 115-*h* may, individually or collectively, be implemented with one or more Application Specific Integrated Circuits (ASICs) adapted to perform some or all of the applicable functions in hardware. Each of the noted modules may be a means for performing one or more functions related to operation of the system 800. Similarly, the components of the base station 105-*f* may, individually or collectively, be implemented with one or more Application Specific Integrated Circuits (ASICs) adapted to perform some or all of the applicable functions in hardware. Each of the noted components may be a means for performing one or more functions related to operation of the system 800.

Figure 9:
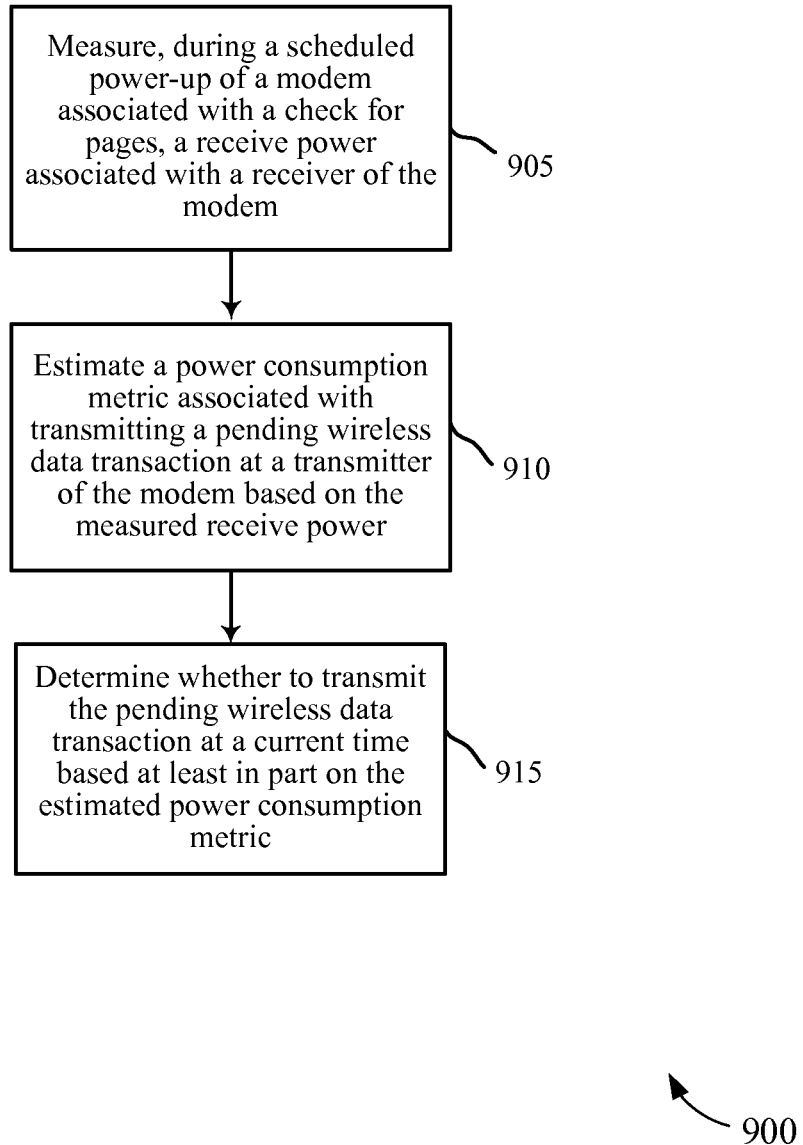
FIG. 9 shows a flowchart diagram of an example method of managing modem power consumption in a mobile device according to some embodiments.

FIG. 9 shows a flowchart diagram of an example of a method 900 for managing modem power consumption in a mobile device. In certain examples, the method 900 may be performed by one or more of the mobile devices 115 described above with respect to the previous Figures.

At block 905, a receive power associated with a receiver of a modem in the mobile device may be measured during a scheduled power-up of the modem associated with a check for paging messages. At block 910, a power consumption metric associated with transmitting a pending wireless data transaction at a transmitter of the modem may be estimated based on the measured receive power. In certain examples, the estimating the power consumption metric may include performing a predetermined mapping function to derive the power consumption metric from the measured receive power of the receiver. In certain examples, the measurement of the receive power and the predetermined mapping function may be performed during each scheduled power-up to check for paging messages, and the measured receive power and results from the mapping function may also be used to determine the estimated power consumption metric for the pending wireless data transaction.

In certain examples, an indication of the power consumption metric may be sent to an application associated with the pending wireless data transaction over an API in response to a request over the API from the application for the power consumption metric. In certain examples, the power consumption metric may be classified into one of a number of predetermined categories, and the indication of the power consumption metric may include the selected category. The determination of block 915 may be performed at the application, at the modem, or a combination of the application and the modem. In examples where the modem performs the determination of block 915, the modem may receive the pending wireless data transaction at a buffer and transmit the pending wireless data transaction from the modem based on the determination.

At block 915, the mobile device may determine whether to transmit the pending wireless data transaction at a first time based at least in part on the estimated power consumption metric. The determination may be based on a comparison between a priority associated with the pending wireless data transaction and the power consumption metric. In certain examples, the mobile device may determine not to transmit the pending wireless data transaction at the first time based on the power consumption metric and estimating a second power consumption metric for the pending wireless data transaction at a second time after the first time. In these cases, the mobile device may power down the modem based at least in part on the determination not to transmit the pending wireless data transaction at the first time. The mobile device may then determine to transmit the pending wireless data transaction at the second time based at least in part on the received second power consumption metric.

In additional or alternative examples, the mobile device may determine not to transmit the pending wireless data transaction at the first time based on the power consumption metric; determine that a timer associated with the pending wireless data transaction has expired; and transmit the pending wireless data transaction based at least in part on the expiration of the timer.

Figure 10:
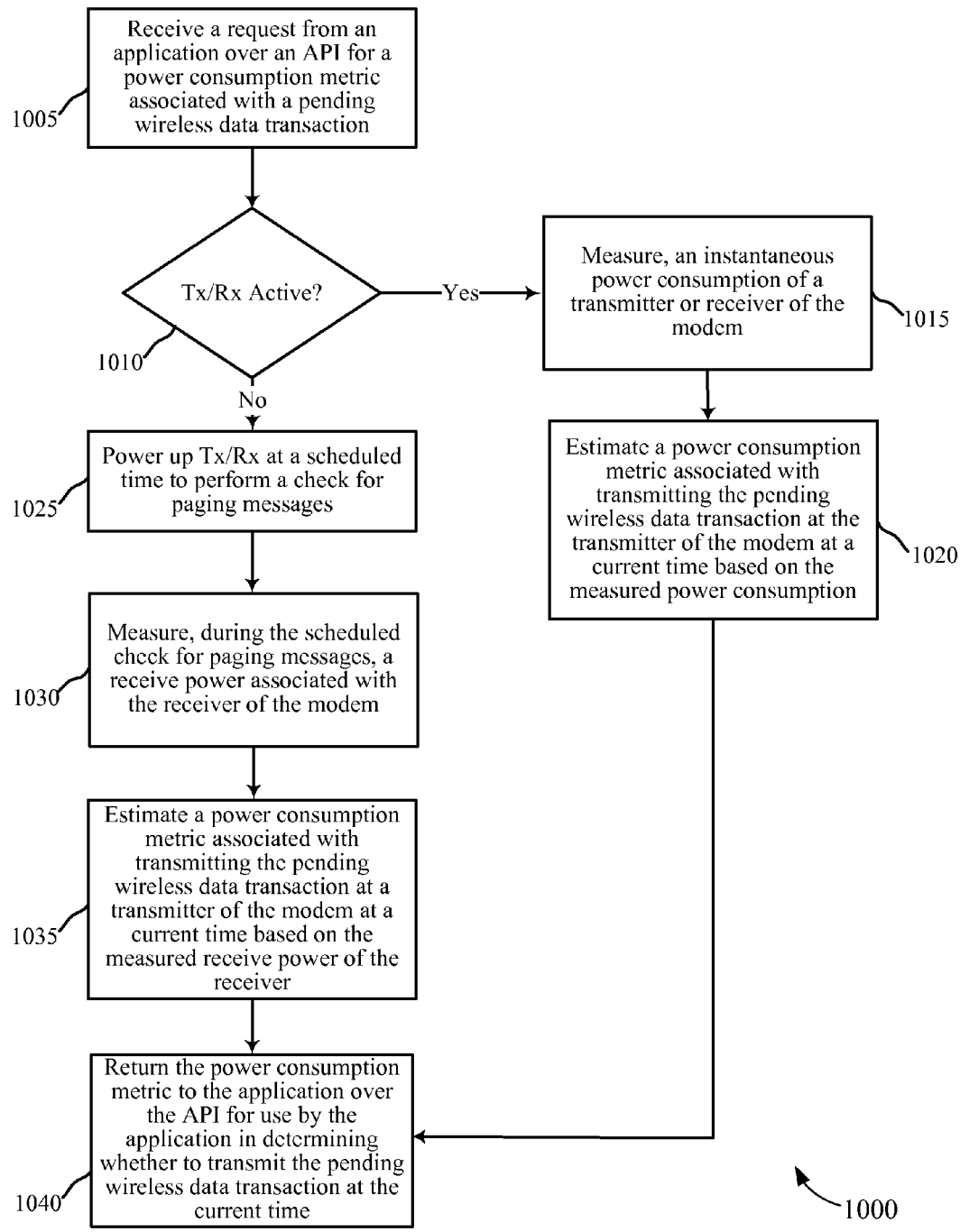
FIG. 10 shows a flowchart diagram of an example method of managing modem power consumption in a mobile device according to some embodiments.

FIG. 10 shows a flowchart diagram of another example method 1000 of managing modem power consumption at a mobile device. The method 1000 of FIG. 10 may be an example of the method 900 of FIG. 9. The method 1000 of the present example may be performed by a modem and related components of the mobile device.

At block 1005, a request may be received from an application over an API. The request may be for a power consumption metric associated with a pending wireless data transaction from the application. At block 1010, a determination may be made of whether the transmitter and/or receiver of the modem is active (i.e., powered up).

If at least one of the transmitter or the receiver of the modem is active (block 1010, YES), an instantaneous receive power of the transmitter or the receiver may be measured at block 1015. At block 1020, a power consumption metric associated with transmitting the pending wireless data transaction at the transmitter of the modem at a current time may be estimated based on the measured receive power, and at block 1040, the power consumption metric may be returned to the application over the API. The application may use the power consumption metric to determine whether to transmit the pending wireless data transaction at the current time.

If, on the other hand, the transmitter and receiver of the modem are powered down in an idle state (decision 1010, NO), at block 1025 the modem may power up at least the receiver at a scheduled time to perform a check for paging messages. At block 1030, an instantaneous receive power associated with the receiver of the modem may be measured during the scheduled check for paging messages. At block 1035, a power consumption metric associated with transmitting the pending wireless data transaction from the transmitter of the modem at the current time may be estimated based on the measured instantaneous receive power of the receiver. At block 1040, the power consumption metric may be returned to the application over the API for use by the application in determining whether to transmit the pending wireless data transaction at the current time.

Figure 11:
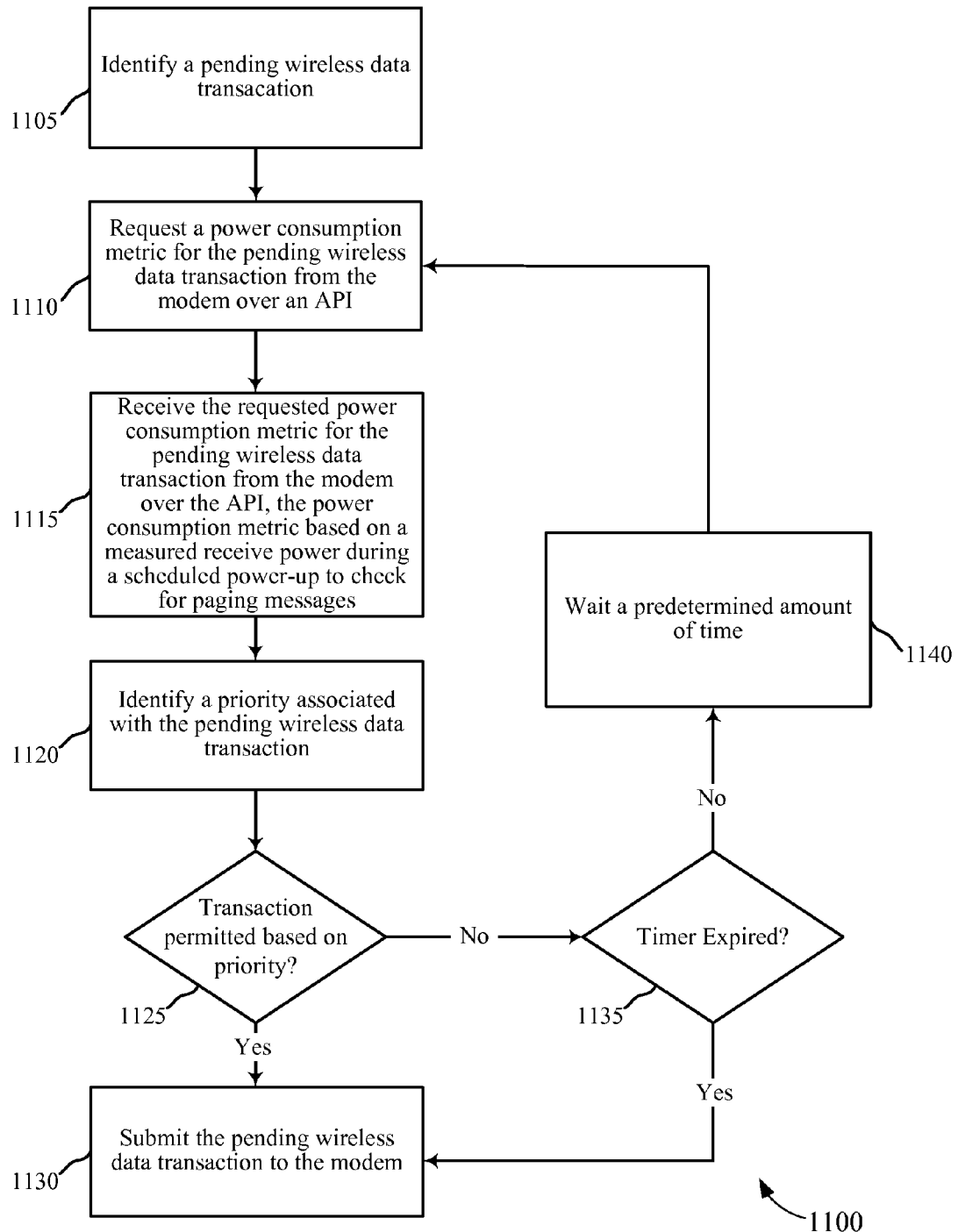
FIG. 11 shows a flowchart diagram of an example method of managing modem power consumption in a mobile device according to some embodiments.

FIG. 11 shows a flowchart diagram of another example method 1100 of managing modem power consumption at a mobile device. The method 1100 of FIG. 11 may be an example of the method 900 of FIG. 9. The method 1100 of the present example may be performed by an application running on the mobile device.

At block 1105, a pending wireless data transaction may be identified. The transaction may originate at the application. At block 1110, a power consumption metric for the pending wireless data transaction may be requested from a modem of the mobile device over an API. At block 1115, the requested power consumption metric for the pending wireless data transaction may be received from the modem over the API. The power consumption metric may be based on a measured receive power during a scheduled power-up to check for paging messages at the modem. At block 1120, a priority associated with the pending wireless data transaction may be identified by the application.

At block 1125, the application may compare the priority of the pending wireless data transaction to the received power consumption metric for the transaction to determine whether transmitting the transaction at a current time is permissible. If transmission of the transaction is permissible at the current time (block 1125, YES) based on the priority and power consumption metric, the pending wireless data transaction may be submitted to the modem for transmission to a base station or other wireless recipient. If transmission of the transaction is not permissible based on priority and the power consumption metric (block 1125, NO), a determination may be made at block 1135 of whether a timer associated with the pending wireless transaction has expired. If the timer has expired (block 1135, YES), then the pending wireless data transaction may be submitted to the modem for wireless transmission at block 1130. If the timer has not expired (block 1140, NO), the application may wait a predetermined amount of time, and flow may return to block 1110.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

I claim:
1. A method of managing power consumption in a modem of a mobile device, comprising:
receiving, from an application running on the mobile device, a request for a power consumption metric indicating a cost of transmitting, from the mobile device, a pending wireless data transaction originating at the application, wherein the request is received while the modem is in an idle state;

buffering the request while the modem is in the idle state until a scheduled power-up of the modem associated with checking for paging messages;

measuring, after the modem powers up to check for the paging messages during the scheduled power-up, a receive power associated with a receiver of the modem;

estimating the power consumption metric at a transmitter of the modem based on the measured receive power associated with the receiver;

providing an indication of the power consumption metric to the application that originated the pending wireless data transaction; and determining, by the application that originated the pending wireless data transaction, whether to transmit the pending wireless data transaction at a first time based at least in part on the estimated power consumption metric.

2. The method of claim 1, wherein the estimating the power consumption metric comprises:

performing a predetermined mapping function to derive the power consumption metric from the measured receive power of the receiver.

3. The method of claim 2, wherein the measured receive power associated with the receiver and the predetermined mapping function are performed during the scheduled power-up of the modem to check for paging messages.

4. The method of claim 2, wherein the performing the predetermined mapping function comprises:

mapping the measured receive power to a transmit power;

mapping the transmit power to an instantaneous cost of transmission; and mapping the instantaneous cost of transmission to a total cost of transmitting the pending wireless data transaction.

5. The method of claim 1, further comprising:

determining, by the application that originated the pending wireless data transaction, not to transmit the pending wireless data transaction at the first time based on the power consumption metric; and estimating a second power consumption metric for the pending wireless data transaction at a second time after the first time.

6. The method of claim 5, further comprising:

powering down the modem based at least in part on the determination not to transmit the pending wireless data transaction at the first time.

7. The method of claim 5, further comprising:

determining, by the application that originated the pending wireless data transaction, to transmit the pending wireless data transaction at the second time based at least in part on the estimated second power consumption metric.

8. The method of claim 1, further comprising:

determining, by the application that originated the pending wireless data transaction, not to transmit the pending wireless data transaction at the first time based on the power consumption metric;

determining that a timer associated with the pending wireless data transaction has expired; and transmitting the pending wireless data transaction based at least in part on the expiration of the timer.

9. The method of claim 8, further comprising:

increasing a priority associated with the pending wireless data transaction in response to the determination that the timer has expired;

wherein the transmission of the pending wireless data transaction is further based at least in part on a determination that the increased priority of the pending wireless data transaction outweighs the power consumption metric.

10. The method of claim 1, further comprising:

identifying a priority associated with the pending wireless data transaction; and comparing the priority associated with the pending wireless data transaction with the power consumption metric associated with transmitting the pending wireless data transaction;

wherein the determining whether to transmit the pending wireless data transaction is based on the comparison.

11. The method of claim 1, wherein:

the indication of the power consumption metric is provided to the application that originated the pending wireless data transaction over an application programming interface (API).

12. The method of claim 11, further comprising:

receiving at the modem the request over the API from the application for the power consumption metric;

wherein the power consumption metric is provided to the application that originated the pending wireless data transaction over the API in response to the received request.

13. The method of claim 11, further comprising:

classifying the power consumption metric into a selected category of a plurality of predetermined categories;

wherein the indication of the power consumption metric comprises the selected category.

14. The method of claim 1, further comprising:

receiving the pending wireless data transaction at a buffer associated with the modem; and transmitting the pending wireless data transaction from the modem to a network based on the determination.

15. A mobile device, comprising:

a transmitter;

a receiver;

a receive power measurement module configured to measure, after a modem powers up to check for paging messages during a scheduled power-up of the modem associated with receiving paging messages, a receive power associated with the receiver;

a power consumption metric module configured to estimate, based on the measured receive power associated with the receiver, a power consumption metric associated with transmitting a pending wireless data transaction originating at an application running on the mobile device, wherein the power consumption metric indicates a cost of transmitting, from the transmitter of the mobile device, the pending wireless data transaction and is estimated in response to a request for the power consumption metric received from the application while the modem is in an idle state, wherein the request is buffered while the modem is in the idle state until the scheduled power-up of the modem, and wherein the power consumption metric module is further configured to provide an indication of the power consumption metric to the application that originated the pending wireless data transaction; and a transaction decision module of the application that originated the wireless data transaction configured to determine whether to transmit the pending wireless data transaction at the transmitter at a first time, wherein the determination is based at least in part on the estimated power consumption metric.

16. The mobile device of claim 15, wherein the power consumption metric module is further configured to:
perform a predetermined mapping function to derive the power consumption metric from the measured receive power of the receiver.

17. The mobile device of claim 16, wherein the measured receive power associated with the receiver and the predetermined mapping function are performed during the scheduled power-up of the modem to check for paging messages.

18. The mobile device of claim 16, wherein the power consumption metric module is further configured to perform the predetermined mapping function by:
mapping the measured receive power to a transmit power;
mapping the transmit power to an instantaneous cost of transmission; and
mapping the instantaneous cost of transmission to a total cost of transmitting the pending wireless data transaction.

19. The mobile device of claim 15, wherein:
the transaction decision module is further configured to determine not to transmit the pending wireless data transaction at the first time based on the power consumption metric; and
the power consumption metric module is further configured to estimate a second power consumption metric for the pending wireless data transaction at a second time after the first time.

20. The mobile device of claim 19, further comprising an idle state module configured to:
power down the modem based at least in part on the determination not to transmit the pending wireless data transaction.

21. The mobile device of claim 19, wherein the transaction decision module is further configured to:
determine to transmit the pending wireless data transaction at the second time based at least in part on the estimated second power consumption metric.

22. The mobile device of claim 15, wherein the transaction decision module is further configured to:
determine not to transmit the pending wireless data transaction at the first time based on the power consumption metric;
determine that a timer associated with the pending wireless data transaction has expired; and
determine to transmit the pending wireless data transaction based at least in part on the expiration of the timer.

23. The mobile device of claim 22, wherein the transaction decision module is further configured to:
increase a priority associated with the pending wireless data transaction in response to the determination that the timer has expired;
wherein the transmission of the pending wireless data transaction is further based at least in part on a determination that the increased priority of the pending wireless data transaction outweighs the power consumption metric.

24. The mobile device of claim 15, wherein the transaction decision module is further configured to:
identify a priority associated with the pending wireless data transaction; and
compare the priority associated with the pending wireless data transaction with the power consumption metric associated with transmitting the pending wireless data transaction;
wherein the determining whether to transmit the pending wireless data transaction at the first time is based on the comparison.

25. The mobile device of claim 15, wherein the power consumption metric module is further configured to:
provide the indication of the power consumption metric to the application that originated the pending wireless data transaction over an application programming interface (API).

26. The mobile device of claim 25, wherein the power consumption metric module is further configured to:
receive the request over the API from the application for the power consumption metric; and
provide the power consumption metric to the application over the API in response to the received request.

27. The mobile device of claim 25, wherein the power consumption metric module is further configured to:
classify the power consumption metric into a selected category of a plurality of predetermined categories;
wherein the indication of the power consumption metric comprises the selected category.

28. An apparatus for managing power consumption in a modem of a mobile device, comprising:
means for receiving, from an application running on the mobile device, a request for a power consumption metric indicating a cost of transmitting, from the mobile device, a pending wireless data transaction originating at the application, wherein the request is received while the modem is in an idle state;
means for buffering the request while the modem is in the idle state until a scheduled power-up of the modem associated with checking for paging messages;
means for measuring, after the modem powers up to check for the paging messages during the scheduled power-up, a receive power associated with a receiver of the modem;
means for estimating the power consumption metric at a transmitter of the modem based on the measured receive power associated with the receiver;
means for providing an indication of the power consumption metric to the application that originated the pending wireless data transaction; and
means for determining, by the application that originated the pending wireless data transaction, whether to transmit the pending wireless data transaction at a first time based at least in part on the estimated power consumption metric.

29. The apparatus of claim 28, wherein the means for estimating the power consumption metric comprises:
means for performing a predetermined mapping function to derive the power consumption metric from the measured receive power of the receiver.

30. The apparatus of claim 29, wherein the measured receive power associated with the receiver and the predetermined mapping function are performed during the scheduled power-up of the modem to check for paging messages.

31. The apparatus of claim 29, wherein the means for performing the predetermined mapping function comprises:
means for mapping the measured receive power to a transmit power;
means for mapping the transmit power to an instantaneous cost of transmission; and
means for mapping the instantaneous cost of transmission to a total cost of transmitting the pending wireless data transaction.

32. The apparatus of claim 28, further comprising:
means for determining, by the application that originated the pending wireless data transaction, not to transmit the pending wireless data transaction at the first time based on the power consumption metric; and means for estimating a second power consumption metric for the pending wireless data transaction at a second time after the first time.

33. The apparatus of claim 32, further comprising:
means for powering down the modem based at least in part on the determination not to transmit the pending wireless data transaction.

34. The apparatus of claim 32, further comprising:
means for determining, by the application that originated the pending wireless data transaction, to transmit the pending wireless data transaction at the second time based at least in part on the estimated second power consumption metric.

35. The apparatus of claim 28, further comprising:
means for determining, by the application that originated the pending wireless data transaction, not to transmit the pending wireless data transaction at the first time based on the power consumption metric;
means for determining that a timer associated with the pending wireless data transaction has expired; and
means for transmitting the pending wireless data transaction based at least in part on the expiration of the timer.

36. The apparatus of claim 35, further comprising:
means for increasing a priority associated with the pending wireless data transaction in response to the determination that the timer has expired;
wherein the transmission of the pending wireless data transaction is further based at least in part on a determination that the increased priority of the pending wireless data transaction outweighs the power consumption metric.

37. The apparatus of claim 28, further comprising:
means for identifying a priority associated with the pending wireless data transaction; and
means for comparing the priority associated with the pending wireless data transaction with the power consumption metric associated with transmitting the pending wireless data transaction;
wherein the determining whether to transmit the pending wireless data transaction at the first time is based on the comparison.

38. The apparatus of claim 28, wherein:
the indication of the power consumption metric is provided to the application that originated the pending wireless data transaction over an application programming interface (API).

39. The apparatus of claim 38, further comprising:
means for receiving at the modem the request over the API from the application for the power consumption metric;
wherein the power consumption metric is provided to the application that originated the pending wireless data transaction over the API in response to the received request.

40. The apparatus of claim 38, further comprising:
means for classifying the power consumption metric into a selected category of a plurality of predetermined categories;
wherein the indication of the power consumption metric comprises the selected category.

41. The apparatus of claim 28, further comprising:
means for receiving the pending wireless data transaction at a buffer associated with the modem; and
means for transmitting the pending wireless data transaction from the modem to a network based on the determination.

42. A computer program product, comprising:
a tangible computer readable storage device comprising computer-readable program code stored thereon, the computer-readable program code comprising:
computer readable program code configured to cause at least one processor to measure, after a modem powers up to check for the paging messages during a scheduled power-up of the modem associated with checking for paging messages, a receive power associated with a receiver of the modem;
computer readable program code configured to cause the at least one processor to estimate, based on the measured receive power associated with the receiver, a power consumption metric associated with transmitting a pending wireless data transaction originating at an application running on a mobile device, wherein the power consumption metric indicates a cost of transmitting, from a transmitter of the mobile device, the pending wireless data transaction and is estimated in response to a request for the power consumption metric received from the application while the modem is in an idle state, wherein the request is buffered while the modem is in the idle state until the scheduled power-up of the modem;
computer readable program code configured to cause the at least one processor to provide an indication of the power consumption metric to the application that originated the pending wireless data transaction; and
computer readable program code configured to cause the at least one processor to determine, at the application that originated the wireless data transaction, whether to transmit the pending wireless data transaction at a first time, wherein the determination is based at least in part on the estimated power consumption metric.

* * * * *